United States Patent
Reinke

(10) Patent No.: US 11,287,441 B2
(45) Date of Patent: Mar. 29, 2022

(54) RESONATOR INCLUDING ONE OR MORE MECHANICAL BEAMS WITH ADDED MASS

(71) Applicant: Honeywell International Inc., Morris Plains, NJ (US)

(72) Inventor: John Reinke, Plymouth, MN (US)

(73) Assignee: Honeywell International Inc., Charlotte, NC (US)

(*) Notice: Subject to any disclaimer, the term of this patent is extended or adjusted under 35 U.S.C. 154(b) by 99 days.

(21) Appl. No.: 16/796,138

(22) Filed: Feb. 20, 2020

(65) Prior Publication Data
US 2021/0140992 A1    May 13, 2021

Related U.S. Application Data

(60) Provisional application No. 62/932,298, filed on Nov. 7, 2019.

(51) Int. Cl.
*G01P 15/097*    (2006.01)
*G01P 15/08*    (2006.01)

(52) U.S. Cl.
CPC ........ *G01P 15/097* (2013.01); *G01P 15/0802* (2013.01)

(58) Field of Classification Search
CPC ...... G01P 15/097; G01P 15/032; G01P 15/18; G01P 15/093; G01P 15/0802; G01P 15/0888; G01P 2015/0814; G01P 2015/0808; G01P 2015/0817; G01P 2015/0828; G01P 2015/0834; G01P 2015/0811
See application file for complete search history.

(56) References Cited

U.S. PATENT DOCUMENTS

| | | | |
|---|---|---|---|
| 4,743,790 | A | 5/1988 | Albert |
| 5,456,111 | A | 10/1995 | Hulsig, II |
| 5,596,145 | A | 1/1997 | Albert et al. |
| 5,914,553 | A | 6/1999 | Adams et al. |

(Continued)

FOREIGN PATENT DOCUMENTS

| | | |
|---|---|---|
| CN | 102243251 A | 11/2011 |
| EP | 1912075 A1 | 4/2008 |

(Continued)

OTHER PUBLICATIONS

U.S. Appl. No. 16/113,949, filed Aug. 27, 2018, naming inventors Strehlow et al.

(Continued)

*Primary Examiner* — Helen C Kwok
(74) *Attorney, Agent, or Firm* — Shumaker & Sieffert, P.A.

(57) ABSTRACT

This disclosure is related to devices, systems, and techniques for determining an acceleration of a vibrating beam accelerometer (VBA). For example, a system includes processing circuitry configured to receive, from a first resonator, one or more electrical signals indicative of a frequency of a first mechanical beam and a frequency of a second mechanical beam, determine, based on the one or more electrical signals, the frequency of the first mechanical beam and the frequency of the second mechanical beam, and calculate, based on the frequency of the first mechanical beam and the frequency of the second mechanical beam, an acceleration of a proof mass assembly.

20 Claims, 10 Drawing Sheets

(56) References Cited

U.S. PATENT DOCUMENTS

| | | | |
|---|---|---|---|
| 5,948,981 A * | 9/1999 | Woodruff | B81B 3/0081 |
| | | | 73/514.29 |
| 5,969,249 A * | 10/1999 | Roessig | G01P 15/0802 |
| | | | 73/514.15 |
| 6,473,290 B2 | 10/2002 | Mochida | |
| 6,874,363 B1 | 4/2005 | Foote et al. | |
| 7,322,240 B2 | 1/2008 | Robert | |
| 7,797,998 B2 | 6/2010 | Mendard et al. | |
| 8,434,362 B2 | 5/2013 | Ohuchi et al. | |
| 8,875,578 B2 | 11/2014 | Smith | |
| 9,689,888 B2 | 6/2017 | Becka | |
| 9,989,553 B2 | 6/2018 | Waters et al. | |
| 10,024,879 B2 | 7/2018 | Clark | |
| 2002/0157467 A1 * | 10/2002 | Collins | G01P 15/0802 |
| | | | 73/504.16 |
| 2005/0132805 A1 | 6/2005 | Park et al. | |
| 2014/0001984 A1 * | 1/2014 | Kuisma | H03B 5/30 |
| | | | 318/116 |
| 2015/0168146 A1 | 6/2015 | Shcheglov et al. | |
| 2016/0139171 A1 * | 5/2016 | Becka | G01P 15/032 |
| | | | 73/514.29 |
| 2016/0349283 A1 * | 12/2016 | Bramhavar | G01P 15/093 |
| 2020/0025790 A1 | 1/2020 | Reinke | |
| 2020/0025792 A1 | 1/2020 | Reinke | |

FOREIGN PATENT DOCUMENTS

| | | |
|---|---|---|
| EP | 3821125 A1 | 5/2016 |
| WO | 2008021144 A2 | 2/2008 |
| WO | 2008043737 A2 | 4/2008 |
| WO | 2020011323 A1 | 1/2020 |

OTHER PUBLICATIONS

U.S. Appl. No. 62/932,397, filed Nov. 7, 2019, naming inventor John Reinke.

Extended Search Report from counterpart European Application No. 20202852.8, dated May 19, 2021, 8 pp.

Response to European Extended Search Report dated May 19, 2021, from counterpart European application No. 20202852.8, filed May 18, 2021, 57 pp.

* cited by examiner

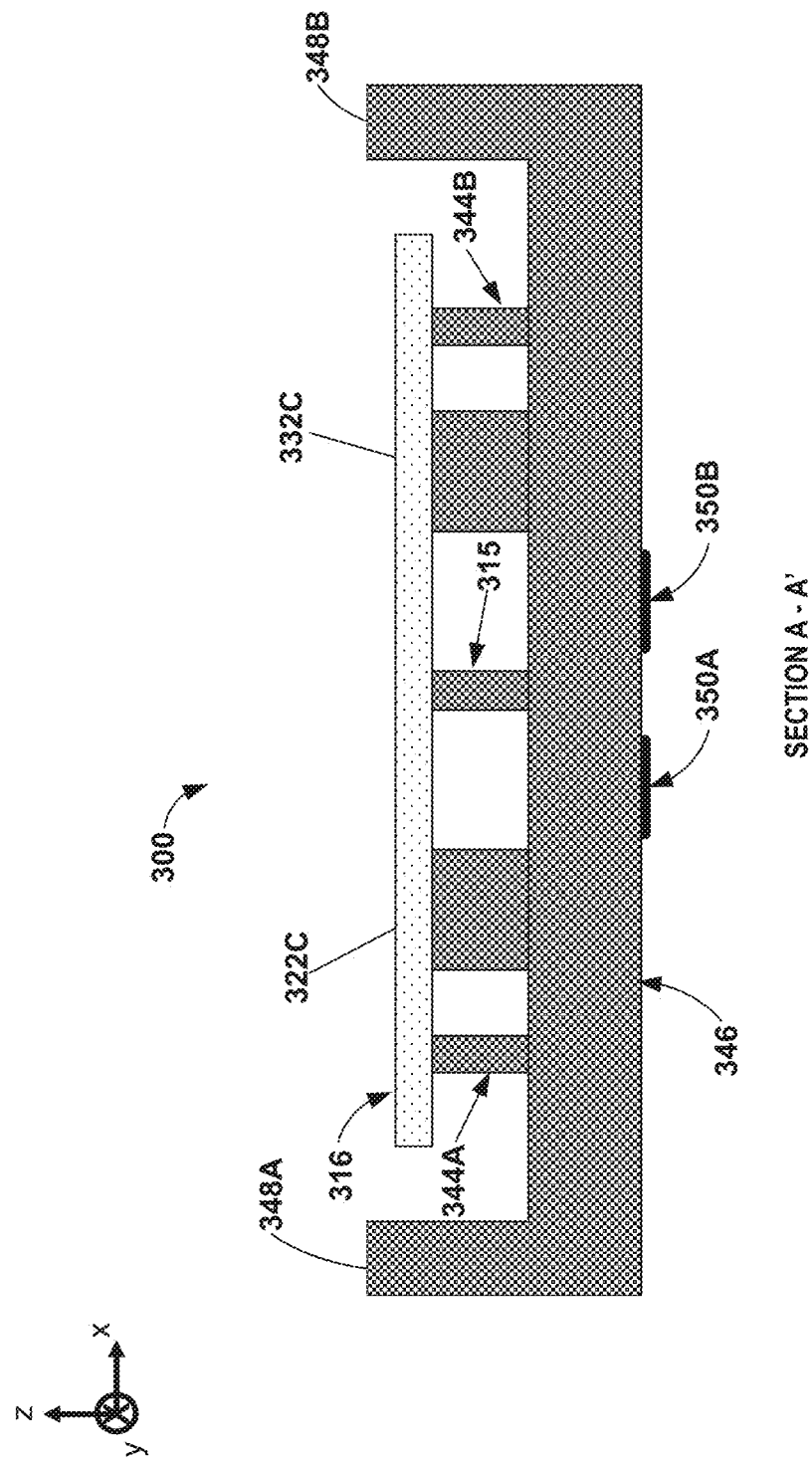

RESONATOR INCLUDING ONE OR MORE MECHANICAL BEAMS WITH ADDED MASS

This application claims the benefit of U.S. Provisional Patent Application No. 62/932,298, filed on Nov. 7, 2019, the entire content of which is incorporated herein by reference.

TECHNICAL FIELD

The disclosure relates to vibrating beam accelerometers.

BACKGROUND

Accelerometers function by detecting a displacement of a proof mass under inertial forces or by detecting an amount of force needed to prevent a displacement of a proof mass. In one example, an accelerometer may detect the displacement of a proof mass by the change in frequency of a resonator connected between the proof mass and a support base. A resonator may be designed to change frequency proportional to the load applied to the resonator by the proof mass under acceleration. The resonator may be electrically coupled to oscillator circuitry, or other signal generation circuitry, which causes the resonator to vibrate at a resonant frequency.

SUMMARY

In general, the disclosure is directed to devices, systems and techniques for determining an acceleration of one or more devices. For example, a vibrating beam accelerometer (VBA) described herein may measure a frequency of one or more resonators and calculate, based on the respective frequency of each resonator of the one or more resonators, an acceleration of the VBA. A resonator may include, for example, a double-ended tuning fork (DETF) structure including a pair of mechanical beams. The VBA may induce a mechanical vibration in the pair of mechanical beams, causing the mechanical beams to vibrate at a resonant frequency. The resonant frequency may change depending on an amount of compression force applied to the resonator or an amount of tension force applied to the resonator. The resonator may be connected to a proof mass such that the proof mass is configured to apply a tension force or apply a compression force to the resonator in accordance with an acceleration of the VBA. In this way, the resonant frequency of the resonator may be correlated with an acceleration of the VBA and processing circuitry may be configured to calculate the acceleration of the VBA based on the resonant frequency of the resonator.

In some examples, a system includes a proof mass assembly including a proof mass, a resonator connection structure, where the resonator connection structure extends parallel to a long axis, a hinge flexure configured to connect the proof mass to the resonator connection structure, where the proof mass rotates about the hinge flexure in response to an acceleration of the system parallel to the long axis of the resonator connection structure, and a first resonator configured to connect the proof mass to the resonator connection structure. The first resonator includes a first mechanical beam extending parallel to the long axis, where the first mechanical beam includes a first mass located at a point along the long axis and a second mechanical beam extending parallel to the long axis, where the second mechanical beam includes a second mass located at the point along the long axis. Additionally, the system includes processing circuitry configured to receive, from the first resonator, one or more electrical signals indicative of a frequency of the first mechanical beam and a frequency of the second mechanical beam, determine, based on the one or more electrical signals, the frequency of the first mechanical beam and the frequency of the second mechanical beam, and calculate, based on the frequency of the first mechanical beam and the frequency of the second mechanical beam, an acceleration of the proof mass assembly.

In some examples, a method includes receiving, by processing circuitry, one or more electrical signals indicative of a frequency of a first mechanical beam and a frequency of a second mechanical beam from a first resonator. A proof mass assembly includes a proof mass; a resonator connection structure, where the resonator connection structure extends parallel to a long axis; a hinge flexure configured to connect the proof mass to the resonator connection structure, where the proof mass rotates about the hinge flexure in response to an acceleration of the system parallel to the long axis of the resonator connection structure; and the first resonator configured to connect the proof mass to the resonator connection structure. The first resonator includes the first mechanical beam extending parallel to the long axis, where the first mechanical beam includes a first mass located at a point along the long axis; and the second mechanical beam extending parallel to the long axis, where the second mechanical beam includes a second mass located at the point along the long axis. Additionally, the method includes determining, by the processing circuitry and based on the one or more electrical signals, the frequency of the first mechanical beam and the frequency of the second mechanical beam; and calculating, by the processing circuitry and based on the frequency of the first mechanical beam and the frequency of the second mechanical beam, an acceleration of the proof mass assembly.

In some examples, a device includes a proof mass; a resonator connection structure, where the resonator connection structure extends parallel to a long axis; a hinge flexure configured to connect the proof mass to the resonator connection structure, where the proof mass rotates about the hinge flexure in response to an acceleration of the system parallel to the long axis of the resonator connection structure; and a first resonator configured to connect the proof mass to the resonator connection structure. The first resonator includes a first mechanical beam extending parallel to the long axis, where the first mechanical beam includes a first mass located at a point along the long axis; and a second mechanical beam extending parallel to the long axis, where the second mechanical beam includes a second mass located at the point along the long axis. The first resonator is configured to output one or more electrical signals indicative of a frequency of the first mechanical beam and a frequency of the second mechanical beam.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

FIG. 3B is a conceptual diagram illustrating a sectional view of a VBA with supporting flexures and with resonators, in accordance with one or more techniques of this disclosure.

Like reference characters denote like elements throughout the description and figures.

DETAILED DESCRIPTION

Figure 1:
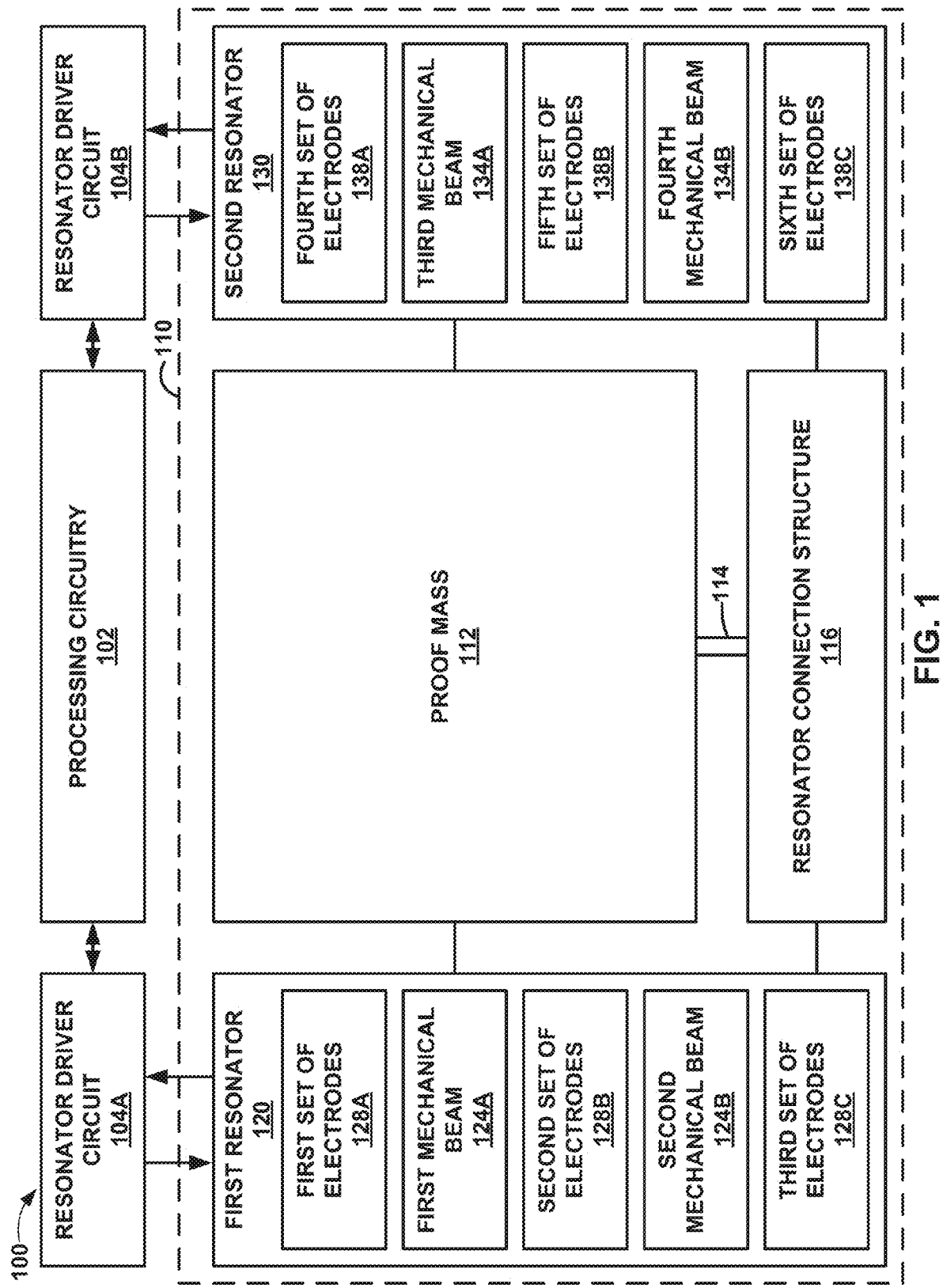
FIG. 1 is a block diagram illustrating an accelerometer system, in accordance with one or more techniques of this disclosure.

This disclosure is directed to devices, systems and techniques for determining an acceleration of a vibrating beam accelerometer (VBA). For example, the disclosure is directed to a VBA with an in-plane proof mass. A VBA configured in accordance with the techniques of this disclosure may include at least one or more resonators, planar geometry, a single primary mechanical anchor between the support base and the VBA, a resonator connector structure connecting the resonators to the single primary anchor and a hinge flexure mechanically connecting the proof mass to the single primary anchor. One or more techniques of this disclosure specify how mechanical beams of the resonators may include added masses and/or form gaps which affect the respective resonant frequencies of the resonators and affect a relationship between the respective resonant frequencies and the acceleration of the VBA.

In some examples, the VBA may include a first resonator and a second resonator, where both of the first resonator and the second resonator are connected to the proof mass. For example, the first resonator and the second resonator may be connected to the proof mass such that the proof mass applies a tension force to the first resonator when the proof mass applies a compression force to the second resonator and the proof mass applies a compression force to the first resonator when the proof mass applies a tension force to the second resonator. Processing circuitry, in some cases, may be configured to calculate a difference between a resonant frequency of the first resonator and a resonant frequency of the second resonator and calculate an acceleration of the VBA based on the difference. For example, the difference between the resonant frequency of the first resonator and the resonant frequency of the second resonator may have a near linear relationship with the acceleration of the VBA. For example, the relationship may include a quadratic nonlinearity coefficient ($K_2$) representing a nonlinearity in the relationship between the difference in resonant frequencies and the acceleration of the VBA.

In some examples, the first resonator may include a first mechanical beam and a second mechanical beam and the second resonator may include a third mechanical beam and a fourth mechanical beam. The first mechanical beam and the second mechanical beam may each include one or more "added mass," where the respective added masses affect the resonant frequency of the first resonator and the quadratic nonlinearity coefficient. The third mechanical beam and the fourth mechanical beam may each include one or more gaps where the added masses are located on the first mechanical beam and the second mechanical beam. For example, the first resonator and the second resonator may be substantially the same, except for the fact that the second resonator forms gaps in one or more locations where the first resonator includes added masses.

The techniques of this disclosure may provide one or more advantages. For example, the respective added masses included by the first mechanical beam and the second mechanical beam, and the respective gaps formed by the third mechanical beam and the fourth mechanical beam may ensure that the quadratic nonlinearity coefficient corresponding to the relationship between the difference in resonant frequencies and the acceleration of the VBA is zero or close to zero (e.g., less than 5 micrograms per gram squared ($\mu g/g^2$)). Systems in which the quadratic nonlinearity coefficient is zero or close to zero may be more beneficial for accurately calculating an acceleration of the VBA as compared with a system where the quadratic nonlinearity coefficient is larger than the quadratic nonlinearity coefficient of the VBA described herein. Additionally, the respective added masses and gaps formed by the mechanical beams may ensure that a difference between the resonant frequency of the first resonator and the resonant frequency of the second resonator while an acceleration of the VBA is zero meters per second squared ($m/s^2$) is nonzero. It may be beneficial for the difference in respective resonant frequencies of the first resonator and the second resonator at zero acceleration to be nonzero in order to decrease an interference between the first resonator and the second resonator as compared with systems in which a difference in respective resonant frequencies of the first resonator and the second resonator at zero acceleration is zero or closer to zero than the system described herein.

FIG. 1 is a block diagram illustrating an accelerometer system 100, in accordance with one or more techniques of this disclosure. As illustrated in FIG. 1, accelerometer system 100 includes processing circuitry 102, resonator driver circuits 104A-104B (collectively, "resonator driver circuits 104"), and proof mass assembly 110. Proof mass assembly 110 includes proof mass 112, resonator connection structure 116, first resonator 120, and second resonator 130. First resonator 120 includes first mechanical beam 124A and second mechanical beam 124B (collectively, "mechanical beams 124"), and first set of electrodes 128A, second set of electrodes 128B, and third set of electrodes 128C (collectively, "electrodes 128"). Second resonator 130 includes third mechanical beam 134A and fourth mechanical beam 134B (collectively, "mechanical beams 134"), and fourth set of electrodes 138A, fifth set of electrodes 138B, and sixth set of electrodes 138C (collectively, "electrodes 138").

Accelerometer system 100 may, in some examples, be configured to determine an acceleration associated with an object (not illustrated in FIG. 1) based on a measured vibration frequency of one or both of first resonator 120 and second resonator 130 which are connected to proof mass 112. In some cases, the vibration of first resonator 120 and second resonator 130 is induced by drive signals emitted by resonator driver circuit 104A and resonator driver circuit 104B, respectively. In turn, first resonator 120 may output a first set of sense signals and second resonator 130 may output a second set of sense signals and processing circuitry 102 may determine an acceleration of the object based on the first set of sense signals and the second set of sense signals.

Processing circuitry 102, in some examples, may include one or more processors that are configured to implement functionality and/or process instructions for execution within accelerometer system 100. For example, processing circuitry 102 may be capable of processing instructions stored in a storage device. Processing circuitry 102 may include, for example, microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, processing circuitry 102 may include any suitable structure, whether in hardware, software, firmware, or any combination thereof, to perform the functions ascribed herein to processing circuitry 102.

A memory (not illustrated in FIG. 1) may be configured to store information within accelerometer system 100 during operation. The memory may include a computer-readable storage medium or computer-readable storage device. In some examples, the memory includes one or more of a short-term memory or a long-term memory. The memory may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, the memory is used to store program instructions for execution by processing circuitry 102.

In some examples, resonator driver circuit 104A may be electrically coupled to first resonator 120. Resonator driver circuit 104A may output a first set of drive signals to first resonator 120, causing first resonator 120 to vibrate at a resonant frequency. Additionally, in some examples, resonator driver circuit 104A may receive a first set of sense signals from first resonator 120, where the first set of sense signals may be indicative of a mechanical vibration frequency of first resonator 120. Resonator driver circuit 104A may output the first set of sense signals to processing circuitry 102 for analysis. In some examples, the first set of sense signals may represent a stream of data such that processing circuitry 102 may determine the mechanical vibration frequency of first resonator 120 in real-time or near real-time.

In some examples, resonator driver circuit 104B may be electrically coupled to second resonator 130. Resonator driver circuit 104B may output a second set of drive signals to second resonator 130, causing second resonator 130 to vibrate at a resonant frequency. Additionally, in some examples, resonator driver circuit 104B may receive a second set of sense signals from second resonator 130, where the second set of sense signals may be indicative of a mechanical vibration frequency of first resonator 130. Resonator driver circuit 104B may output the second set of sense signals to processing circuitry 102 for analysis. In some examples, the second set of sense signals may represent a stream of data such that processing circuitry 102 may determine the mechanical vibration frequency of second resonator 130 in real-time or near real-time.

Proof mass assembly 110 may secure proof mass 112 to resonator connection structure 116 using first resonator 120 and second resonator 130. For example, Proof mass 112 may be secured to resonator connection structure 116 in a first direction with hinge flexure 114. Proof mass 112 may be secured to resonator connection structure 116 in a second direction with first resonator 120 and resonator 130. Proof mass 112 may be configured to pivot about hinge flexure 114, applying pressure to first resonator 120 and second resonator 130 in the second direction. For example, if proof mass 112 pivots towards first resonator 120, proof mass 112 applies a compression force to first resonator 120 and applies a tension force to second resonator 130. If proof mass 112 pivots towards second resonator 130, proof mass 112 applies a tension force to first resonator 120 and applies a compression force to second resonator 130.

An acceleration of proof mass assembly 110 may affect a degree to which proof mass 112 pivots about hinge flexure 114. As such, the acceleration of proof mass assembly 110 may determine an amount of force applied to first resonator 120 and an amount of force applied to second resonator 130. An amount of force (e.g., compression force or tension force) applied to resonators 120, 130 may be correlated with an acceleration vector of proof amass assembly 110, where the acceleration vector is normal to hinge flexure 114.

In some examples, the amount of force applied to first resonator 120 may be correlated with a resonant frequency in which first resonator 120 vibrates in response to resonator driver circuit 104A outputting the first set of drive signals to first resonator 120. For example, first resonator 120 may include mechanical beams 124. In this way, first resonator 120 may represent a double-ended tuning fork (DETF) structure, where each mechanical beam of mechanical beams 124 vibrate at the resonant frequency in response to receiving the first set of drive signals. Electrodes 128 may generate electrical signals indicative of a mechanical vibration frequency of first mechanical beam 124A and a mechanical vibration frequency of second mechanical beam 124B. For example, the first set of electrodes 128A may generate a first electrical signal, the second set of electrodes 128B may generate a second electrical signal, and the third set of electrodes 128C may generate a third electrical signal. Electrodes 128 may output the first electrical signal, the second electrical signal, and the third electrical signal to processing circuitry 102.

Processing circuitry 102 may determine a difference between the first electrical signal and the second electrical signal and determine the mechanical vibration frequency of first mechanical beam 124A based on the difference between the first electrical signal and the second electrical signal. Additionally, or alternatively, processing circuitry 102 may determine a difference between the second electrical signal and the third electrical signal and determine the mechanical vibration frequency of second mechanical beam 124B based on the difference between the second electrical signal and the third electrical signal. In some examples, the mechanical vibration frequency of the first mechanical beam 124A and the second mechanical beam 124B are substantially the same when resonator driver circuit 104A outputs the first set of drive signals to first resonator 120. For example, the mechanical vibration frequency of first mechanical beam 124A and the mechanical vibration frequency of second mechanical beam 124B may both represent the resonant frequency of first resonator 120, where the resonant frequency is correlated with an amount of force applied to first resonator 120 by proof mass 112. The amount of force that proof mass 112 applies to first resonator 120 may be correlated with an acceleration of proof mass assembly 110 relative to a long axis of resonator connection structure 116. As such, processing circuitry 102 may calculate the acceleration of proof mass 112 relative to the long axis of resonator connection structure 116 based on the detected mechanical vibration frequency of mechanical beams 124.

In some examples, the amount of force applied to second resonator 130 may be correlated with a resonant frequency in which second resonator 130 vibrates in response to resonator driver circuit 104B outputting the second set of drive signals to second resonator 130. For example, second resonator 130 may include mechanical beams 134. In this way, second resonator 130 may represent a double-ended tuning fork (DETF) structure, where each mechanical beam of mechanical beams 134 vibrate at the resonant frequency in response to receiving the second set of drive signals. Electrodes 138 may generate electrical signals indicative of a mechanical vibration frequency of third mechanical beam 134A and a mechanical vibration frequency of fourth mechanical beam 134B. For example, the fourth set of electrodes 138A may generate a fourth electrical signal, the fifth set of electrodes 138B may generate a fifth electrical signal, and the sixth set of electrodes 138C may generate a sixth electrical signal. Electrodes 138 may output the fourth electrical signal, the fifth electrical signal, and the sixth electrical signal to processing circuitry 102.

Processing circuitry 102 may determine a difference between the fourth electrical signal and the fifth electrical signal and determine the mechanical vibration frequency of third mechanical beam 134A based on the difference between the fourth electrical signal and the fifth electrical signal. Additionally, or alternatively, processing circuitry 102 may determine a difference between the fifth electrical signal and the sixth electrical signal and determine the mechanical vibration frequency of fourth mechanical beam 134B based on the difference between the fifth electrical signal and the sixth electrical signal. In some examples, the mechanical vibration frequency of the third mechanical beam 134A and the fourth mechanical beam 134B are substantially the same when resonator driver circuit 104B outputs the second set of drive signals to second resonator 130. For example, the mechanical vibration frequency of third mechanical beam 134A and the mechanical vibration frequency of fourth mechanical beam 134B may both represent the resonant frequency of second resonator 130, where the resonant frequency is correlated with an amount of force applied to second resonator 130 by proof mass 112. The amount of force that proof mass 112 applies to second resonator 130 may be correlated with an acceleration of proof mass assembly 110 relative to a long axis of resonator connection structure 116. As such, processing circuitry 102 may calculate the acceleration of proof mass 112 relative to the long axis of resonator connection structure 116 based on the detected mechanical vibration frequency of mechanical beams 134.

In some cases, processing circuitry 102 may calculate an acceleration of proof mass assembly 110 relative to the long axis of resonator connection structure 116 based on a difference between the detected mechanical vibration frequency of mechanical beams 124 and the detected mechanical vibration frequency of mechanical beams 134. When proof mass assembly 110 accelerates in a first direction along the long axis of resonator connection structure 116, proof mass 112 pivots towards first resonator 120, causing proof mass 112 to apply a compression force to first resonator 120 and apply a tension force to second resonator 130. When proof mass assembly 110 accelerates in a second direction along the long axis of resonator connection structure 116, proof mass 112 pivots towards second resonator 130, causing proof mass 112 to apply a tension force to first resonator 120 and apply a compression force to second resonator 130. A resonant frequency of a resonator which is applied a first compression force may be greater than a resonant frequency of the resonator which is applied a second compression force, when the first compression force is less than the second compression force. A resonant frequency of a resonator which is applied a first tension force may be greater than a resonant frequency of the resonator which is applied a second tension force, when the first tension force is greater than the second tension force.

Although accelerometer system 100 is illustrated as including resonator connection structure 116, in some examples not illustrated in FIG. 1, proof mass 112, first resonator 120, and second resonator 130 are not connected to a resonator connection structure. In some such examples, proof mass 112, first resonator 120, and second resonator 130 are connected to a substrate. For example, hinge flexure 114 may fix proof mass 112 to the substrate such that proof mass 112 may pivot about hinge flexure 114, exerting tension forces and/or compression forces on first resonator 120 and second resonator 130.

In some examples, the difference between the resonant frequency of first resonator 120 and the resonant frequency of second resonator 130 may have a near linear relationship with the acceleration proof mass assembly 110. In some examples, the relationship between the difference in resonant frequencies of resonators 120, 130 and the acceleration of proof mass assembly 110 might not be perfectly linear. For example, the relationship may include a quadratic nonlinearity coefficient ($K_2$) representing a nonlinearity in the relationship between the difference in the resonant frequencies of resonators 120, 130 and the acceleration of proof mass assembly 110. It may be beneficial for the quadratic nonlinearity coefficient to be zero or close to zero so that processing circuitry 102 is configured to accurately determine the acceleration of proof mass assembly 110 based on the relationship between the difference in resonant frequencies of resonators 120, 130 and the acceleration of proof mass assembly 110. One type of common-mode error is as vibration rectification error (VRE). VRE may be as a change in zero-g output, or accelerometer bias, that occurs during vibration. VRE may be caused by nonlinearity in an accelerometer input-to-output transfer function. Typically, the most dominant source is the quadratic nonlinearity coefficient ($K_2$). In order to avoid error vibration, it may be beneficial to mitigate this quadratic nonlinearity.

Additionally, it may be beneficial for a difference between the resonant frequency of first resonator 120 and the resonant frequency of second resonator 130 to be nonzero while an acceleration of proof mass assembly 110 is zero m/s$^2$. It may be beneficial for the difference in respective resonant frequencies of resonators 120, 130 to be nonzero while proof mass assembly 110 is not accelerating in order to decrease an interference between first resonator 120 and second resonator 130 as compared with systems in which a difference, at zero acceleration, in respective resonant frequencies of a first resonator and a second resonator is zero or closer to zero than the system described herein.

In some examples, accelerometer system 100 may ensure that the quadratic nonlinearity coefficient is close to zero and ensure that the zero-acceleration difference in the respective resonant frequencies of resonators 120, 130 is nonzero by including added masses on first resonator 120. For example, first mechanical beam 124A and second mechanical beam 124B may each include one or more added masses, where the one or more added masses affect the resonant frequency of first resonator 120 and the quadratic nonlinearity coefficient. Third mechanical beam 134A and fourth mechanical beam 134B may each form a one or more gaps where the added masses are located on first mechanical beam 124A and second mechanical beam 124B. In some examples, first resonator 120 and second resonator 130 are substantially the same except that first resonator 120 includes the added mass on first mechanical beam 124A and the added mass on second mechanical beam 124B, where third mechanical beam 134A includes a gap corresponding to the added mass on first mechanical beam 124A and fourth mechanical beam 134B includes a gap corresponding to the added mass on second mechanical beam 124B. Such differences between the first resonator 120 and the second resonator 130 may ensure that the quadratic nonlinearity coefficient is close to zero (e.g., less than 5 $\mu g/g^2$) and ensure that the zero-acceleration difference in the respective resonant frequencies of resonators 120, 130 is nonzero.

For VBAs with two identical resonators, even-order nonlinearities (e.g., quadratic nonlinearities, $4^{th}$ order nonlinearities) are common-mode error sources nominally eliminated by differential output. However, mismatched resonators, such as first resonator 120 and second resonator 130, may results in an accelerometer $K_2$ that is not necessarily set to zero. Mismatched resonators may be desirable to avoid operating both resonators at the same frequency. Driving two resonators at similar frequencies may cause the resonators to interfere with each other (mechanically and electrically), which ultimately degrades the output of the VBA. Resonators 120 and 130 may ensure that $K_2$ is zero or close to zero, and mitigate such interference which degrades the output of the VBA.

Although accelerometer system 100 is described as having two resonators, in other examples not illustrated in FIG. 1, an accelerometer system may include less than two resonators or greater than two resonators. For example, an accelerometer system may include one resonator. Another accelerometer system may include four resonators.

Figure 2:
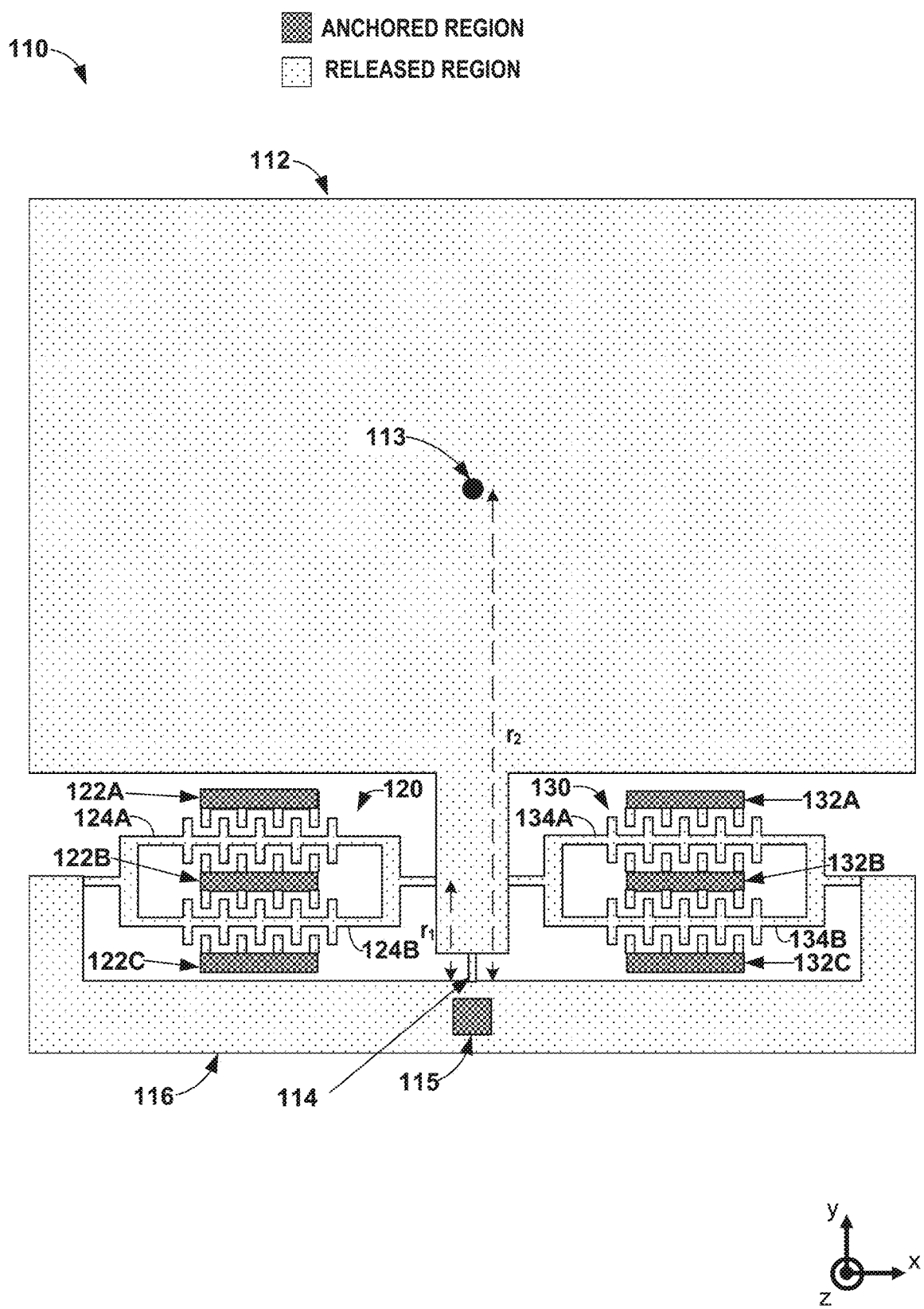
FIG. 2 is a conceptual diagram illustrating a vibrating beam accelerometer (VBA), in accordance with one or more techniques of this disclosure.

FIG. 2 is a conceptual diagram illustrating a VBA 110, in accordance with one or more techniques of this disclosure. For example, FIG. 2 illustrates a top view of VBA 110 including proof mass 112, hinge flexure 114, anchor 115, resonator connection structure 116, first resonator 120, and second resonator 130. VBA 110 may be an example of proof mass assembly 110 of FIG. 1.

VBA 110 includes proof mass 112 connected to a rigid resonator connection structure 116 at hinge flexure 114, and resonators 120, 130. For a VBA according to this disclosure, proof mass 112 may move in a plane parallel to the plane of the support base (not shown in FIG. 2). A support base may be a substrate of, for example, a quartz or silicon wafer. Resonators 120, 130 of VBA 110 convert the inertial force of proof mass 112 under acceleration, to a change in the driven resonant frequency. The VBA outputs a change in the resonant frequency of each resonator as an indication of the amount of acceleration. In some examples, the resonators may be located adjacent to the proof mass so that the resonators receive the proof mass force amplified through lever action.

In the example of a MEMS VBA, VBA 110 may be fabricated from a dissolved wafer process that produces VBA 110 as a silicon mechanical structure tethered to lower and upper glass substrates (not shown in FIG. 2) at specific anchor regions, e.g. anchor 115. The glass substrates may be etched in other areas to define released regions of VBA 110, which include air gaps that allow the silicon portions, such as proof mass 112, to move freely relative to the substrate. Areas which are not etched are bonded to silicon to define mechanical anchors. The geometry of both the silicon mechanism and anchor regions may be defined by photolithography.

A dissolved wafer process to fabricate a silicon VBA and glass substrates is just one example of a technique to fabricate a VBA of this disclosure. Other techniques may be used to fabricate the geometry of VBA 110. Some other examples may include materials such as quartz ($SiO_2$), piezoelectric material, and similar materials. Other processes may include isotropic etching, chemical etching, deep reactive-ion etching (DRIE) and similar processes. In the example of FIG. 2, proof mass 112, resonator connection structure 116, hinge flexure 114, resonators 120, 130 may be comprised of a monolithic material, which results in the components of VBA 110 all with the same coefficient of thermal expansion (CTE). The components of VBA 110 are all in the same plane, parallel to the X-Y plane as shown in FIG. 2.

Proof mass 112 connects to resonator connection structure 116 at anchor 115 by hinge flexure 114. The point at which hinge flexure 114 connects to anchor 115 is the center of rotation for proof mass 112. First resonator 120 and second resonator 130 connect to the same primary anchor 115 by rigid resonator connection structure 116. Resonators 120, 130 connect to proof mass 112 at a distance r1 from the center of rotation for proof mass 112. Center of mass 113 for proof mass 112 is at a distance r2 from the center of rotation for proof mass 112. This results in the inertial force of proof mass 112 amplified by the leverage ratio r2/r1.

In other words, hinge flexure 114 may be configured to flexibly connect proof mass 112 to the resonator connection structure 116. Hinge flexure 114 suspends proof mass 112 parallel to the support base (not shown in FIG. 2) at anchor 115. In response to an acceleration of VBA 110, proof mass 112 rotates about the hinge flexure 114 in its plane, parallel to the X-Y plane and parallel to the plane of the support base (not shown in FIG. 2). The support base of this disclosure may be formed from the substrate using the etching processes described above.

Resonators 120, 130, in the example of FIG. 2, include anchored combs and mechanical beams with released combs. First resonator 120 includes mechanical beams 124 with released combs and anchored combs 122A-122C (collectively, "anchored combs 122") and second resonator 130 includes mechanical beams 134 released combs and anchored combs 132A-132C (collectively, "anchored combs 132"). In some examples, anchored combs may be referred to as stator combs. Resonators 120, 130 are configured to flexibly connect the proof mass 112 to resonator connection structure 116 and to flex within the plane of proof mass 112 based on the rotation of the proof mass 112 about hinge flexure 114.

In some examples, anchored comb 122A may include a first set of electrodes (not illustrated by FIG. 2) configured to generate a first electrical signal, anchored comb 122B may include a second set of electrodes (not illustrated by FIG. 2) configured to generate a second electrical signal, and anchored comb 122C may include a third set of electrodes not illustrated by FIG. 2) configured to generate a third electrical signal. In some examples, anchored comb 132A may include a fourth set of electrodes (not illustrated by FIG. 2) configured to generate a fourth electrical signal, anchored comb 132B may include a fifth set of electrodes (not illustrated by FIG. 2) configured to generate a fifth electrical signal, and anchored comb 132C may include a sixth set of electrodes not illustrated by FIG. 2) configured to generate a sixth electrical signal. Resonators 120, 130 may output the first electrical signal, the second electrical signal, the third electrical signal, the fourth electrical signal, the fifth electrical signal, and the sixth electrical signal to processing circuitry (not illustrated by FIG. 2) configured to calculate an acceleration of VBA 110 based on the electrical signals.

Each of the two resonators 120, 130 resonate at a respective resonant frequency. In some examples, a difference between a resonant frequency of first resonator 120 while an acceleration of VBA 110 is zero meters per second squared (m/s$^2$) and a resonant frequency of second resonator 130 while an acceleration of VBA 110 is zero m/s$^2$ is nonzero. VBA 110 includes metal layers deposited onto the glass substrates (not shown in FIG. 2). These metal layers define electrical wires that connect silicon electrodes to bond pads. The bond pads may be external to VBA 110 and used to electrically connect to external circuitry that excites and sustains mechanical motion at the resonant frequency for each resonator of resonators 120, 130 through electrostatic actuation, e.g., by applying an electric charge. In the presence of external acceleration, proof mass 112 will deflect and apply axial force to mechanical beams 124 and mechanical beams 134 (collectively, "mechanical beams 124,134") of resonators 120, 130. This axial force from proof mass 112 causes a change in the driven resonant frequency such that the frequency change may be used to measure external acceleration on VBA 110.

The tines of the released combs on mechanical beams 124,134, anchored combs 132, and anchored combs 122 may enable detection of a change in resonant frequency, which may be translated as an amount of force (e.g., increase or decrease of force) and further translated as an acceleration of VBA 110. For example, during calibration, the change in frequency may represent an amount of force applied to the respective mechanical beams of mechanical beams 124,134. In turn, processing circuitry may calculate the acceleration of VBA 110 based on the amount of force applied to the mechanical beam. In the example of FIG. 2, the two resonators 120, 130 may allow for a differential frequency measurement results from change in frequency when a force (e.g., compression or tension) is placed on mechanical beams 124,134 by rotation of proof mass 112.

The differential frequency measurement output by the sense signals from VBA 110 is used to reject sources of error common to both resonators. One example may include a temperature change. That is, a change in operating condition, such as a temperature change may affect both resonators the same way. A second example would be any shift in voltages applied to both resonators. A differential frequency measurement may subtract sources of common error applied to both resonators by subtracting the common error and leaving just the signal caused by acceleration on VBA 110. The differential frequency measurement may then ultimately lead to improved bias repeatability for the accelerometer.

In some examples, the resonators may have a different resonant frequency, for example, first resonator 120 may be configured to resonate at a different frequency than second resonator 130. In some examples, the mass of one resonator may be configured to be different from one or more other resonators. A VBA with resonators that have a different resonant frequency may provide a benefit, for example, when the VBA is at zero g, i.e. essentially no acceleration experienced by the VBA, the resonators may not vibrate at exactly the same frequency. The different frequency at zero g causes an intentional offset in the VBA and may result in improved detectability and performance.

In the example of FIG. 2, two resonators are used to provide a differential frequency measurement. In other examples, the techniques of this disclosure may also apply to VBA's with more or fewer resonators. In other examples, the one or more resonators may be oriented at any angle, not just x and y while still using the techniques of this disclosure. Though shown as double-ended tuning fork (DETF) comb resonators in the example of FIG. 2, in other examples, resonators 120, 130 may be configured as other types of resonators. For example, instead of including a DETF, one or both of resonators 120, 130 may include a single mechanical beam or a more complex resonator geometry. Also, mechanical beams 124,134 may include a piezoelectric material and may not include comb tines.

In the example of VBA 110, resonators 120, 130 may be configured to flex in a direction substantially parallel to a long axis of the resonator connection structure 116. The long axis of resonator connection structure 116 is parallel to the X-axis in the example of FIG. 2. Resonators 120, 130 are oriented along the X-axis in the example of VBA 110. In this disclosure, substantially parallel means structures or planes are parallel within manufacturing and measurement tolerances.

Resonator connection structure 116 connects resonators 120, 130 to primary anchor 115 through a sufficiently rigid connection that allows proof mass 112 to exert axial force on the mechanical beams 124,134. Resonator connection structure 116 is sized to be stiffer than the axial spring constant of the resonators. The geometry of resonator connection structure 116 and resonators 120, 130, according to the techniques of this disclosure, may configure proof mass 112, mechanical beams 124,134, and resonator connection structure 116 to be connected to the support base by anchor 115. Resonator connection structure 116 may reduce or prevent bias errors that may otherwise result from the thermal expansion mismatch between the glass substrate (support base) and the silicon mechanism (e.g., proof mass 112). In other words, the design of the silicon and glass masks are such that both the proof mass 112 and resonators 120, 130 are primarily anchored to a single region, e.g. at anchor 115.

An advantage of the geometry of a VBA of this disclosure may include to reducing or preventing thermal expansion mismatch, as well as other forces exerted on the substrate from reaching resonators 120, 130 and significantly straining mechanical beams 124,134. The geometry of this disclosure may have an advantage of ultimately providing a more precise measurement of external acceleration when compared to a VBA with different geometry. In other words, anchor 115 may be configured to allow a first thermal expansion of the support base, and a second thermal expansion of the monolithic material of resonators 120, 130 and resonator connection structure 116, in examples in which the first thermal expansion is different than the second thermal expansion. The geometry of resonator connection structure 116 is configured to substantially prevent other forces applied to the support base from transferring to either the proof mass 112 or the at least two resonators. Some examples of other forces may include forces applied to VBA 110 by the circuit board, or other structure, on which VBA 110 is mounted. The circuit board may be subjected to forces, such as squeezing or twisting that may be transferred to the components on the circuit board, including VBA 110.

Figure 3A:
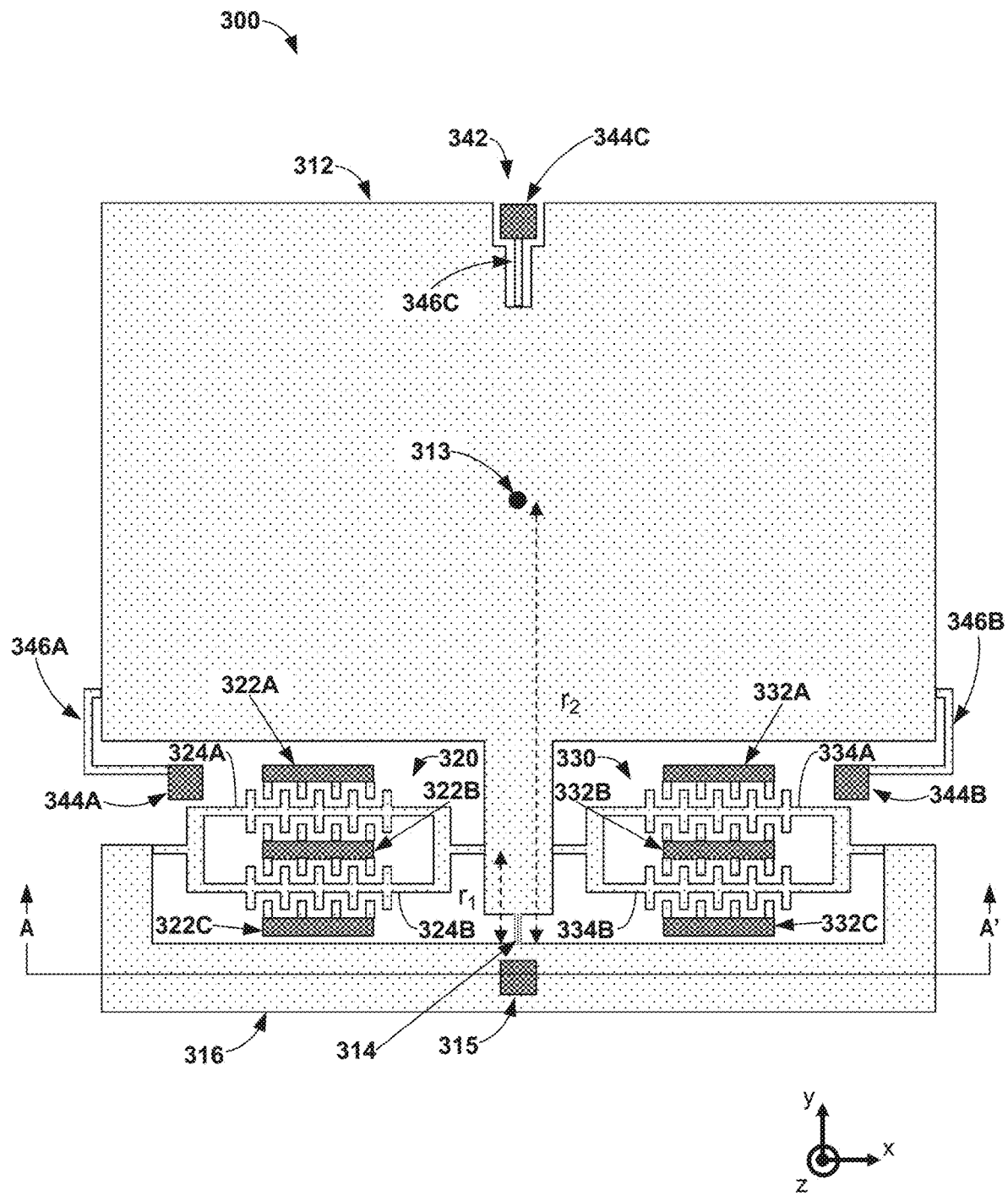
FIG. 3A is a conceptual diagram illustrating a VBA including supporting flexures and with resonators, in accordance with one or more techniques of this disclosure.

FIG. 3A is a conceptual diagram illustrating a VBA 300 including supporting flexures and with resonators, in accordance with one or more techniques of this disclosure. Similar to FIG. 2, FIG. 3A is a top view of VBA 300 showing the anchor 315 to the support base, but the support base is not shown. VBA 300 includes proof mass 312 connected to anchor 315 and resonator connection structure 316 at hinge flexure 314, and first resonator 320 and second resonator 330 (collectively, "resonators 320, 330"). Proof mass 312 may be substantially the same as proof mass 112 of FIG. 1 except that proof mass 312 is configured to interact with one or more support flexures to stiffen movement of proof mass 312 in the out-of-plane (z) direction. Hinge flexure 314 may be an example of hinge flexure 114 of FIG. 1. Resonator connection structure 316 may be an example of resonator connection structure 116 of FIG. 1. First resonator 320 may be an example of first resonator 120 of FIG. 1. Second resonator 330 may be an example of second resonator 130 of FIG. 1. FIG. 3A also shows section A-A', which runs along the long axis of resonator connection structure 316 and through anchor 315.

Proof mass 312 includes supporting flexures, but otherwise the functions and description of proof mass 312 is the same as proof mass 312 described above in relation to FIG. 2. For example, proof mass 312 connects to resonator connection structure 316 at anchor 315 by hinge flexure 314. The point at which hinge flexure 314 connects to anchor 315 is the center of rotation for proof mass 312. Resonators 320, 330 connect to the same primary anchor 315 by resonator connection structure 316. Resonators 18A and 18B connect to proof mass 312 at a distance r1 from the center of rotation for proof mass 312. Center of mass 313 for proof mass 312 is at a distance r2 from the center of rotation for proof mass 312. As with VBA 110 shown in FIG. 2, this results in the inertial force of proof mass 312 on mechanical beams 324, 334 amplified by the leverage ratio r2/r1.

Proof mass 312 may include one or more support flexures to stiffen movement of proof mass 312 in the out-of-plane (z) direction. In other words, the support flexures, e.g. flexure 342, coupled to proof mass 312 is configured to restrict out-of-plane motion of the proof mass with respect to the X-Y plane parallel to the proof mass 312 and resonator connection structure 316. These flexures are configured to be substantially more flexible in the in-plane (x and y) directions than the rigid resonator connection structure or the axial stiffness of the resonators. For example, flexure 342 includes an anchor portion, connected to the support base (not shown in FIG. 3A) similar to the primary anchor 315. Flexure 342 may include a flexible portion 346C connected between the anchor portion 344C and proof mass 312. The flexible portion 346C may be of the same or similar material to that of proof mass 312. The configuration of the one or more support flexures may reduce out of plane movement, while avoiding bias caused by forces applied to the accelerometer mechanism (e.g. proof mass 312 and resonators 18A and 18B) that may be caused by CTE mismatch between the substrate and the accelerometer mechanism.

Proof mass 312 may include additional support flexures, such as the flexures with anchor portions 344A and 344B and flexible portions 346A and 346B. As described above for flexure 342, flexible portions 346A and 346B may be of the same or similar material to proof mass 312. The position of anchor portions 344A and 344B and the shape and configuration of flexible portions 346A and 346B shown in FIG. 3A is just one example technique for providing support flexures to stiffen movement of proof mass 312 in the out-of-plane (z) direction. In other examples, flexible portions 346A and 346B may have different shapes, such as a straight beam or an S-shape. In other examples, VBA 300 may have more or fewer support flexures. The anchor portions of support flexures of this disclosure may be configured to not exert significant forces on proof mass 312, so the mechanism of VBA 300 may still be connected to the structure of the support base primarily by a single anchor region, e.g. anchor 315. As with VBA 110 described above in relation to FIG. 2, advantages of the geometry of VBA 300 include reduced bias errors that may otherwise result from the thermal expansion mismatch between the glass substrate (support base) and the silicon mechanism (e.g. proof mass 312).

As described above in relation to FIG. 2, use of a single primary mechanical anchor may reduce or prevent bias errors that can be caused by external mechanical forces applied to the circuit board, package, and/or substrate that contains the accelerometer mechanism. Since the source of these forces may be unavoidable (e.g., thermal expansion mismatch between the substrate and mechanism), the geometry of the VBA of this disclosure may mechanically isolate the sensitive components. Another advantage may include reduced cost and complexity, by achieving the mechanical isolation within the MEMS mechanism, which may avoid the need for additional manufacturing steps or components, such as discrete isolation stages.

FIG. 3B is a conceptual diagram illustrating a sectional view of a VBA with supporting flexures and with resonators, in accordance with one or more techniques of this disclosure. FIG. 3B shows section A-A', which runs down the long axis of resonator connection structure 316 and through anchor 315. Items in FIG. 3B with the same reference numbers as in FIGS. 2 and 3A have the same description, properties and function as described above. For example, VBA 300 includes proof mass 312 (not shown in FIG. 3B) connected to resonator connection structure 316 at anchor 315. FIG. 3B also shows the anchor portion of anchored combs 122C and 132C, as well as the anchored portions of the support flexures, 344A and 344B.

As described above in relation to FIG. 2, VBA 300 may be fabricated using silicon and glass masks such that both the proof mass 312 and resonator connection structure 316 are primarily anchored to a single region, e.g. at anchor 315. The released silicon mechanical structure of VBA 300 may be tethered to support base 346, which may be a glass substrate, such as quartz substrate or a silicon substrate. Proof mass 312 may be also tethered at other anchor regions, e.g. anchor portions 344A and 344B, configured to allow the released silicon portions, such as proof mass 312 and the mechanical beams 324 and 334 of resonators 320, 330 (not shown in FIG. 3B) to move freely relative to the support base 346.

Support base 346 may include enclosing structures, such as structures 348A and 348B, which may surround the released portions of VBA 300. In some examples, VBA 300 may include both lower support base 346 and an upper support (not shown in FIG. 3B). In some examples the anchored portions, e.g. anchor 315, may be mechanically connected to both the lower support base 346 and the upper support. Support base 346 may define a second plane, also substantially parallel to the X-Y plane that is different from the plane of the released portions of VBA 300. The plane defined by the released portions of VBA 300 (e.g. mechanical beams 324, 334 and proof mass 312) may be substantially parallel to the second plane defined by support base 346. As described above in relation to FIG. 2, air gaps between the plane of the proof mass and the plane of support base 346 may allow the silicon portions, such as the proof mass, to move freely relative to the substrate.

Resonator connection structure 316 may be configured to be more rigid than the resonators. The rigid structure of resonator connection structure 316 connects to the resonators and branches back to the primary mechanical anchor 315, which is connected to support base 346. Resonator connection structure 316, as described above, may be sized to be stiffer than the axial spring constant of the resonators and supports the resonators in the in-plane (e.g. x and y) directions. In some examples, resonator connection structure 316 may be an order of magnitude stiffer than mechanical beams 324, 334. The single primary anchor 315 allows the mechanical connections of the released portions of VBA 300 to thermally expand at a different rate or direction of the support base 346 without being restrained by other connections to support base 346 that may cause bias and inaccuracy.

Support base 346 may include metal layers deposited onto the glass substrates (not shown in FIG. 3B), which define electrical wires that connect silicon electrodes to wire bond pads. In some examples, support base 346 may include bond pads and other metal structures on the bottom surface of support base 346 (e.g. as indicated by the arrow from support base 346), such as conductive paths 350A and 350B. In some examples, support base 346 may include metal layers on the top surface, e.g. on the surface opposite the bottom surface, and in other examples, support base 346 may include intermediate metal layers between the top and bottom surfaces (not shown in FIG. 3B). In some examples the metal layers may electrically connect to each other with vias, or other types of connections through support base 346. In some examples, electrical wires may also be defined with other conductive material other than metal. As described above in relation to FIG. 2, the metal layers, or other conductive material, may define electrical paths to carry signals to and from VBA 300, such as conductive paths 350A and 350B.

As described above in relation to FIGS. 2 and 3A, each resonator of the one or more resonators may include a mechanical beam with released comb (e.g., mechanical beams 324) and an anchored comb (e.g. 122C and 132C). As shown in FIG. 3B, the anchor portion of anchored combs 122C and 132C extend from the plane of support base 346 to the plane of the released portions of VBA 300. The comb portions of anchored combs 122C and 132C are supported in the same plane as mechanical beams 324, 334 and proof mass 112 and proof mass 312, described above in relation to FIG. 2 and FIG. 3A, respectively.

Figure 4A:
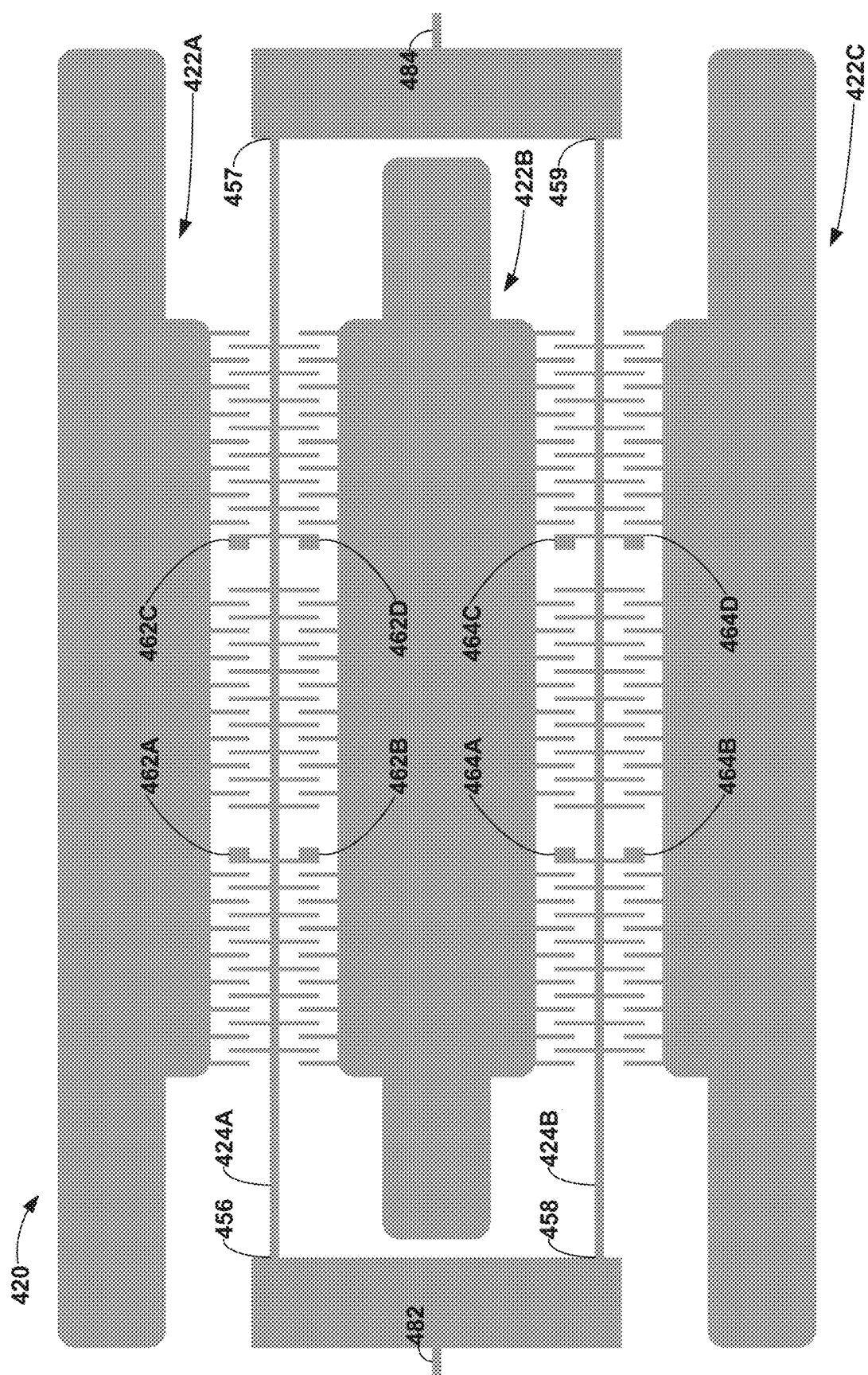
FIG. 4A is a conceptual diagram illustrating a first resonator with added masses, in accordance with one or more techniques of this disclosure.

FIG. 4A is a conceptual diagram illustrating a first resonator 420 with added masses, in accordance with one or more techniques of this disclosure. First resonator 420 may be an example of one or both of first resonator 120 of FIGS. 1-2 and first resonator 320 of FIG. 3A. First resonator 420 may include anchored combs 422A-422C (collectively, "anchored combs 422"), first mechanical beam 424A, and second mechanical beam 424 (collectively, "mechanical beams 424"). First mechanical beam 424A may include added masses 462A-462D (collectively, "added masses 462"). Second mechanical beam 424B may include added masses 464A-464D (collectively, "added masses 464").

In some examples, anchored comb 422A includes one or more anchored comb sections, anchored comb 422B includes one or more anchored comb sections, and anchored comb 422C includes one or more anchored comb sections. In some examples, any one or combination of the anchored comb sections of anchored comb 422A may include one or more electrodes of a first set of electrodes (e.g., first set of electrodes 128A of FIG. 1). In some examples, any one or combination of the anchored comb sections of anchored comb 422B may include one or more electrodes of a second set of electrodes (e.g., second set of electrodes 128A). In some examples, any one or combination of the anchored comb sections of anchored comb 422C may include one or more electrodes of a third set of electrodes (e.g., third set of electrodes 128C).

In some examples, a resonator driver circuit may deliver a drive signal to first resonator 420 via any one or combination of the first set of electrodes, the second set of electrodes, and the third set of electrodes, causing first resonator 420 to vibrate at a resonant frequency. For example, the first mechanical beam 424A and the second mechanical beam 424B may vibrate at the resonant frequency. In turn, the first set of electrodes may generate a first electrical signal, the second set of electrodes may generate a second electrical signal, and the third set of electrodes may generate a third electrical signal. First resonator 420 may output the first electrical signal, the second electrical signal, and the third electrical signal to processing circuitry (not illustrated in FIG. 4A) which is configured to determine the resonant frequency of the first resonator 420 based on the first electrical signal, the second electrical signal, and the third electrical signal.

In some examples, the resonant frequency of first resonator 420 may be correlated with an amount of force applied to first resonator 420 by a proof mass, such as proof mass 112 of FIG. 1. For example, a first end 482 of first resonator 420 may be fixed to a resonator connection structure (e.g., resonator connection structure 116 of FIG. 1) and a second end 484 of first resonator 420 may be fixed to the proof mass. If the proof mass rotates towards first resonator 420 in response to an acceleration in a first direction, the proof mass may apply a compression force to first resonator 420. If the proof mass rotates away from first resonator 420 in response to an acceleration in a second direction, the proof mass may apply a tension force to first resonator 420. In some examples, if acceleration is at zero $m/s^2$, the proof mass may apply no force to first resonator 420. The resonant frequency of first resonator 420 may decrease as the compression force applied by the proof mass increases in response to an increase in acceleration in the first direction, and the resonant frequency of first resonator 420 may increase as the tension force applied by the proof mass increases in response to an increase in acceleration in the second direction. In this way, a relationship may exist between the resonant frequency of first resonator 420 and the acceleration of an accelerometer which includes first resonator 420.

Added masses 462 and added masses 464 may affect the relationship between acceleration and the resonant frequency of first resonator 420. For example, a quadratic nonlinearity coefficient defining the relationship between the acceleration and the resonant frequency of first resonator 420 may be smaller as compared with a quadratic nonlinearity coefficient defining a relationship between an acceleration and a resonant frequency of a resonator which does not include added masses 462 and added masses 464. It may be beneficial for the relationship between acceleration and the resonant frequency of first resonator 420 to be as close to linear as possible (e.g., the quadratic nonlinearity coefficient being as small as possible) in order to ensure that the electrical signals generated by first resonator 420 allow processing circuitry to accurately determine acceleration.

In some examples, added mass 462A and added mass 462B may be placed at a location along first mechanical beam 424A that is within a range from 25% to 45% along a length of first mechanical beam 424A from first end 456 to second end 457. For example, added mass 462A and added mass 462B may be placed at a location that is 35% of a distance between first end 456 to second end 457. In some examples, added mass 462C and added mass 462D may be placed at a location along first mechanical beam 424A that is within a range from 55% to 75% along a length of first mechanical beam 424A from first end 456 to second end 457. For example, added mass 462C and added mass 462D may be placed at a location that is 65% of a distance between first end 456 to second end 457.

In some examples, added mass 464A and added mass 464B may be placed at a location along second mechanical beam 424B that is within a range from 25% to 45% along a length of second mechanical beam 424B from first end 458 to second end 459. For example, added mass 464A and added mass 464B may be placed at a location that is 35% of a distance between first end 458 to second end 459. In some examples, added mass 464C and added mass 464D may be placed at a location along second mechanical beam 424B that is within a range from 55% to 75% along a length of second mechanical beam 424B from first end 458 to second end 459. For example, added mass 464C and added mass 464D may be placed at a location that is 65% of a distance between first end 458 to second end 459.

Figure 4B:
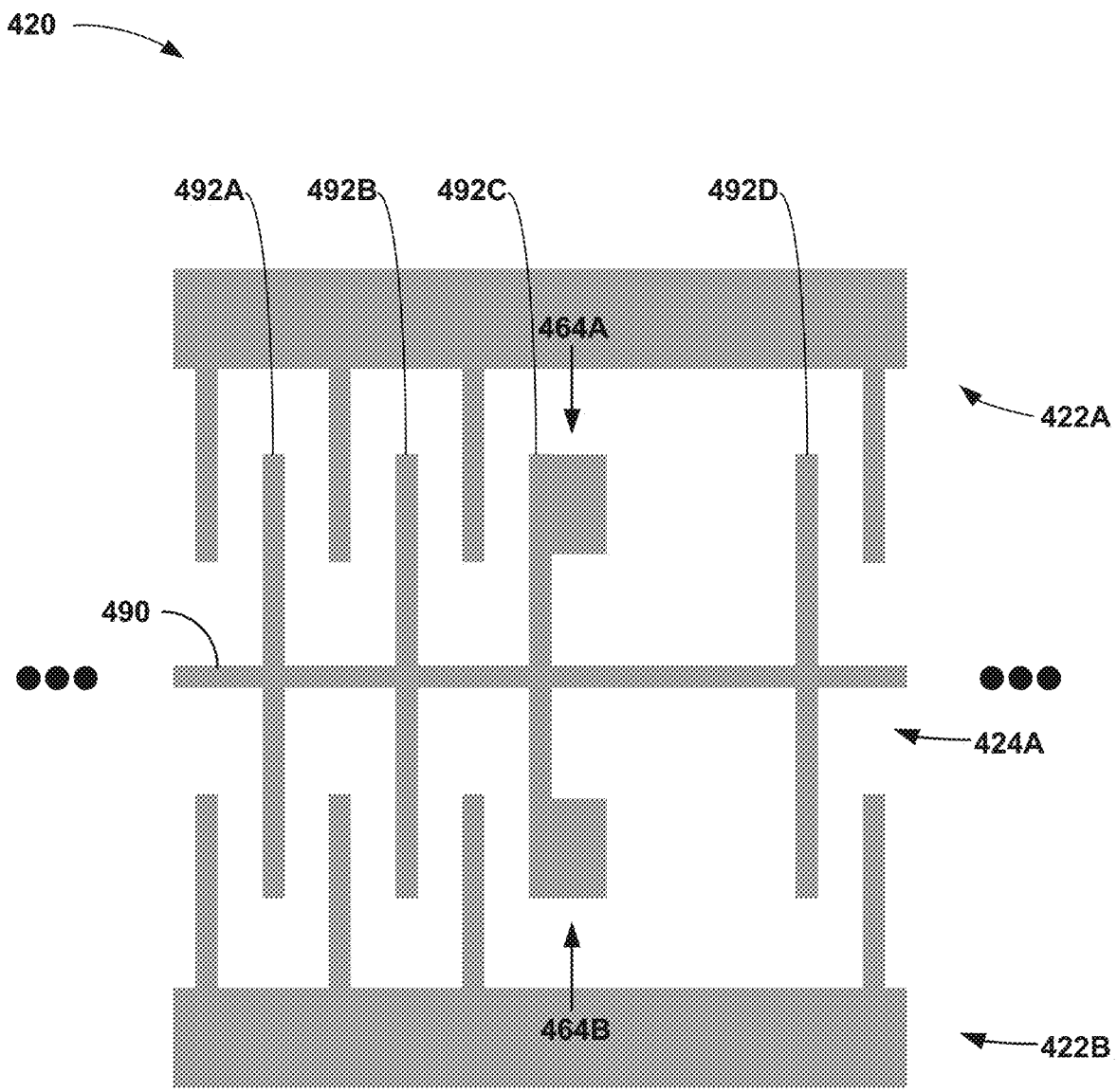
FIG. 4B is a conceptual diagram illustrating a portion of the first resonator of FIG. 4A including added masses, in accordance with one or more techniques of this disclosure.

FIG. 4B is a conceptual diagram illustrating a portion of first resonator 420 of FIG. 4A including added masses 462A and 462B, in accordance with one or more techniques of this disclosure. For example, first mechanical beam 424A includes a primary member 490 and a set of secondary members 492A-492D (collectively, "set of secondary members 492"). As seen in FIG. 4B, each secondary member of the set of secondary members 492 extends normal to primary member 490. First mechanical beam 424A may include additional secondary members and additional other components that are not illustrated in FIG. 4B. Each secondary member of the set of secondary members 492 may be substantially the same, except that secondary member 492C includes added mass 462A and added mass 462B.

Figure 5A:
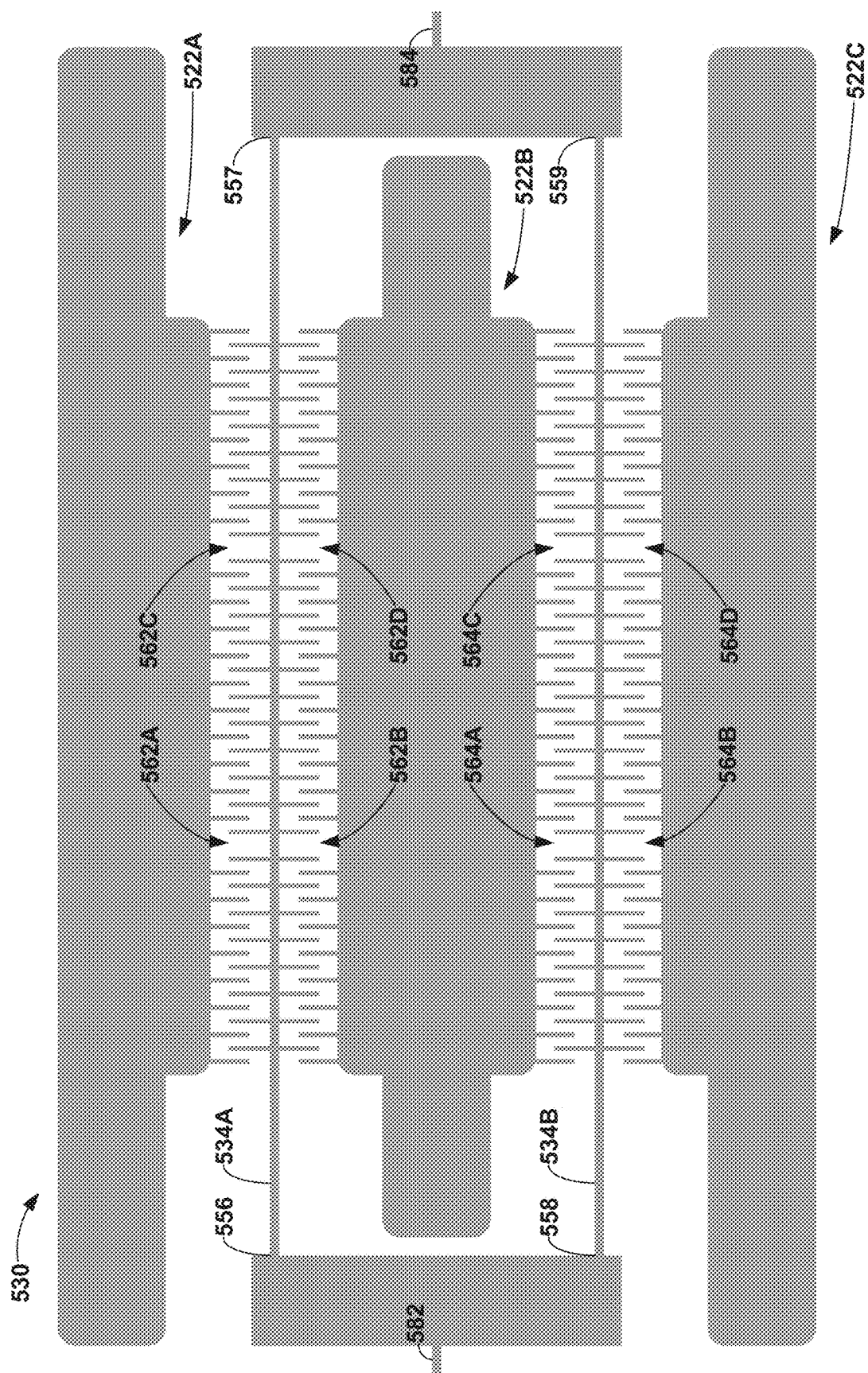
FIG. 5A is a conceptual diagram illustrating a second resonator forming gaps, in accordance with one or more techniques of this disclosure.

FIG. 5A is a conceptual diagram illustrating a second resonator 530 forming gaps, in accordance with one or more techniques of this disclosure. Second resonator 530 may be an example of one or both of second resonator 130 of FIGS. 1-2 and second resonator 330 of FIG. 3A. Second resonator 530 may include anchored combs 532A-532C (collectively, "anchored combs 532"), third mechanical beam 534A, and fourth mechanical beam 534B (collectively, "mechanical beams 534"). Third mechanical beam 534A may form gaps 562A-562D (collectively, "gaps 562"). Fourth mechanical beam 534B may form gaps 564A-564D (collectively, "gaps 564").

In some examples, anchored comb 532A may include one or more anchored comb sections, anchored comb 532B may include one or more anchored comb sections, and anchored comb may include one or more anchored comb sections. In some examples, any one or combination of the anchored comb sections of anchored comb 532A may include one or more electrodes of a fourth set of electrodes (e.g., fourth set of electrodes 138A of FIG. 1). In some examples, any one or combination of the anchored comb sections of anchored comb 532B may include one or more electrodes of a fifth set of electrodes (e.g., fifth set of electrodes 138B). In some examples, any one or combination of the anchored comb sections of anchored comb 532C may include one or more electrodes of a sixth set of electrodes (e.g., sixth set of electrodes 138C).

In some examples, a resonator driver circuit may deliver a drive signal to second resonator 530 via any one or combination of the fourth set of electrodes, the fifth set of electrodes, and the sixth set of electrodes, causing second resonator 530 to vibrate at a resonant frequency. For example, the third mechanical beam 534A and the fourth mechanical beam 534B may vibrate at the resonant frequency of second resonator 530. In turn, the fourth set of electrodes may generate a fourth electrical signal, the fifth set of electrodes may generate a fifth electrical signal, and the sixth set of electrodes may generate a sixth electrical signal. Second resonator 530 may output the fourth electrical signal, the fifth electrical signal, and the sixth electrical signal to processing circuitry (not illustrated in FIG. 5A) which is configured to determine the resonant frequency of the second resonator 530 based on the fourth electrical signal, the fifth electrical signal, and the sixth electrical signal.

In some examples, the resonant frequency of second resonator 530 may be correlated with an amount of force applied to second resonator 530 by a proof mass, such as proof mass 112 of FIG. 1. For example, a first end 582 of second resonator 530 may be fixed to the proof mass and a second end 584 of second resonator 530 may be fixed to a resonator connection structure (e.g., resonator connection structure 116 of FIG. 1). If the proof mass rotates away from second resonator 530 in response to an acceleration in a first direction, the proof mass may apply a tension force to second resonator 530. If the proof mass rotates towards second resonator 530 in response to an acceleration in a second direction, the proof mass may apply a compression force to second resonator 530. In some examples, if acceleration is at zero m/s$^2$, the proof mass may apply no force to second resonator 530. The resonant frequency of second resonator 530 may decrease as the compression force applied by the proof mass increases in response to an increase in acceleration in the second direction, and the resonant frequency of second resonator 530 may increase as the tension force applied by the proof mass increases in response to an increase in acceleration in the first direction. In this way, a relationship may exist between the resonant frequency of second resonator 530 and the acceleration of an accelerometer which includes second resonator 530.

Gaps 562 and gaps 564 may affect the relationship between acceleration and the resonant frequency of second resonator 530. For example, a quadratic nonlinearity coefficient defining the relationship between the acceleration and the resonant frequency of second resonator 530 may be smaller as compared with a quadratic nonlinearity coefficient defining a relationship between an acceleration and a resonant frequency of a resonator which does not include gaps 562 and gaps 564. It may be beneficial for the relationship between acceleration and the resonant frequency of second resonator 530 to be as close to linear as possible (e.g., the quadratic nonlinearity coefficient being as small as possible) in order to ensure that the electrical signals generated by second resonator 530 allow processing circuitry to accurately determine acceleration. In some examples, gaps 562 represent "holes" where added masses 462 are included on first resonator 420 of FIGS. 4A-4B. In some examples, gaps 564 represent holes where added masses 464 are included on first resonator 420 of FIGS. 4A-4B.

In some examples, gap 562A and gap 562B may be placed at a location along third mechanical beam 534A that is within a range from 25% to 45% along a length of third mechanical beam 534A from first end 556 to second end 557. For example, gap 562A and gap 562B may be placed at a location that is 35% of a distance between first end 556 to second end 557. In some examples, gap 562C and gap 562D may be placed at a location along third mechanical beam 534A that is within a range from 55% to 75% along a length of third mechanical beam 534A from first end 556 to second end 557. For example, gap 562C and gap 562D may be placed at a location that is 65% of a distance between first end 556 to second end 557.

In some examples, gap 564A and gap 564B may be placed at a location along fourth mechanical beam 534B that is within a range from 25% to 45% along a length of fourth mechanical beam 534B from first end 558 to second end 559. For example, gap 564A and gap 564B may be placed at a location that is 35% of a distance between first end 558 to second end 559. In some examples, gap 564C and gap 564D may be placed at a location along fourth mechanical beam 534B that is within a range from 55% to 75% along a length of fourth mechanical beam 534B from first end 558 to second end 559. For example, gap 564C and gap 564D may be placed at a location that is 65% of a distance between first end 558 to second end 559.

Figure 5B:
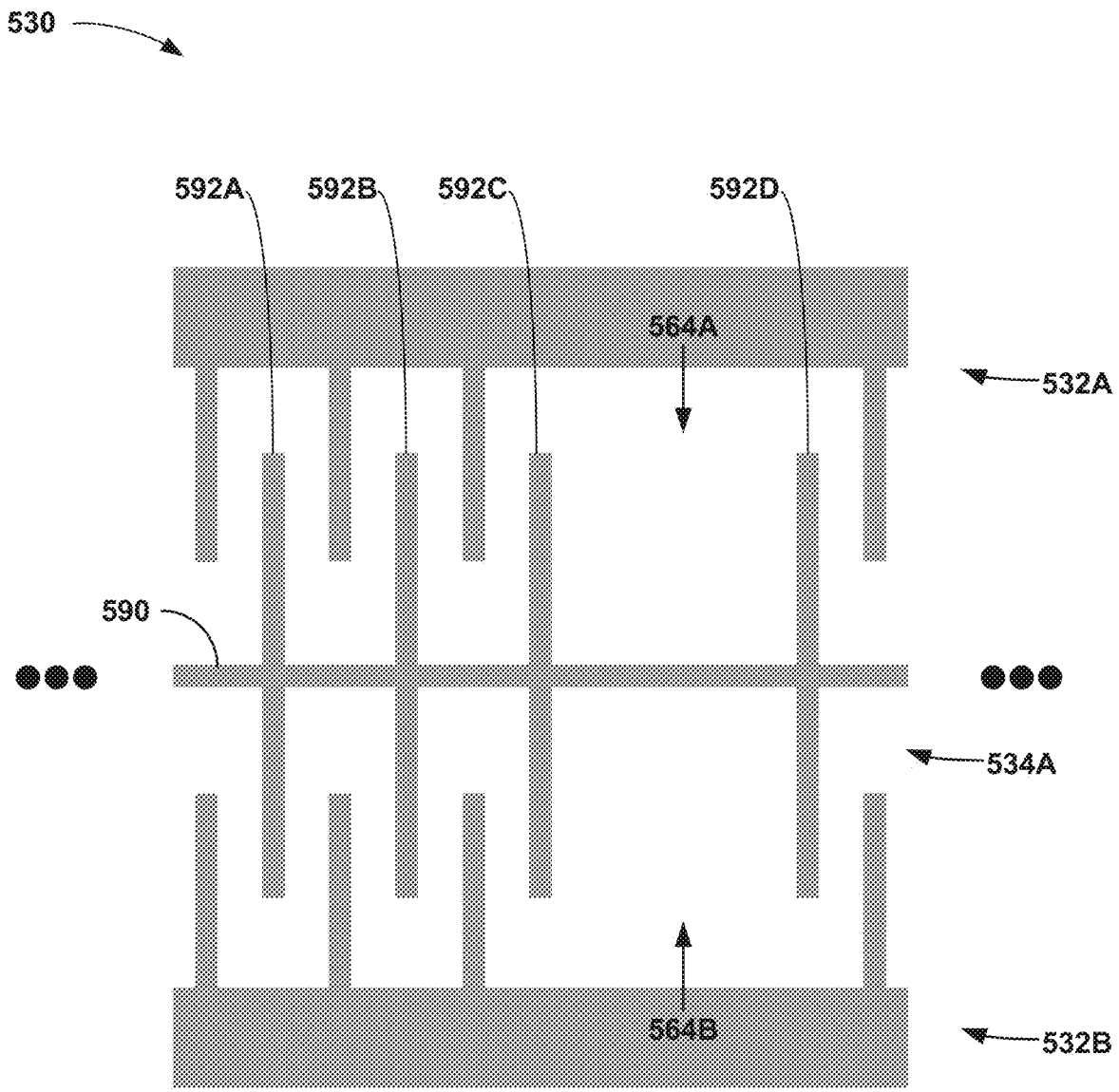
FIG. 5B is a conceptual diagram illustrating a portion of second resonator of FIG. 5A including gaps, in accordance with one or more techniques of this disclosure.

FIG. 5B is a conceptual diagram illustrating a portion of second resonator 530 of FIG. 5A including gaps 562A and 562B, in accordance with one or more techniques of this disclosure. For example, third mechanical beam 534A includes a primary member 590 and a set of secondary members 592A-592D (collectively, "set of secondary members 592"). As seen in FIG. 5B, each secondary member of the set of secondary members 592 extends normal to primary member 590. Third mechanical beam 534A may include additional secondary members and additional other components that are not illustrated in FIG. 5B. Each secondary member of the set of secondary members 592 may be substantially the same, except a distance between secondary member 592C and 592D is greater than a distance between any other pair of consecutive secondary members of the set of secondary members 592.

Figure 6:
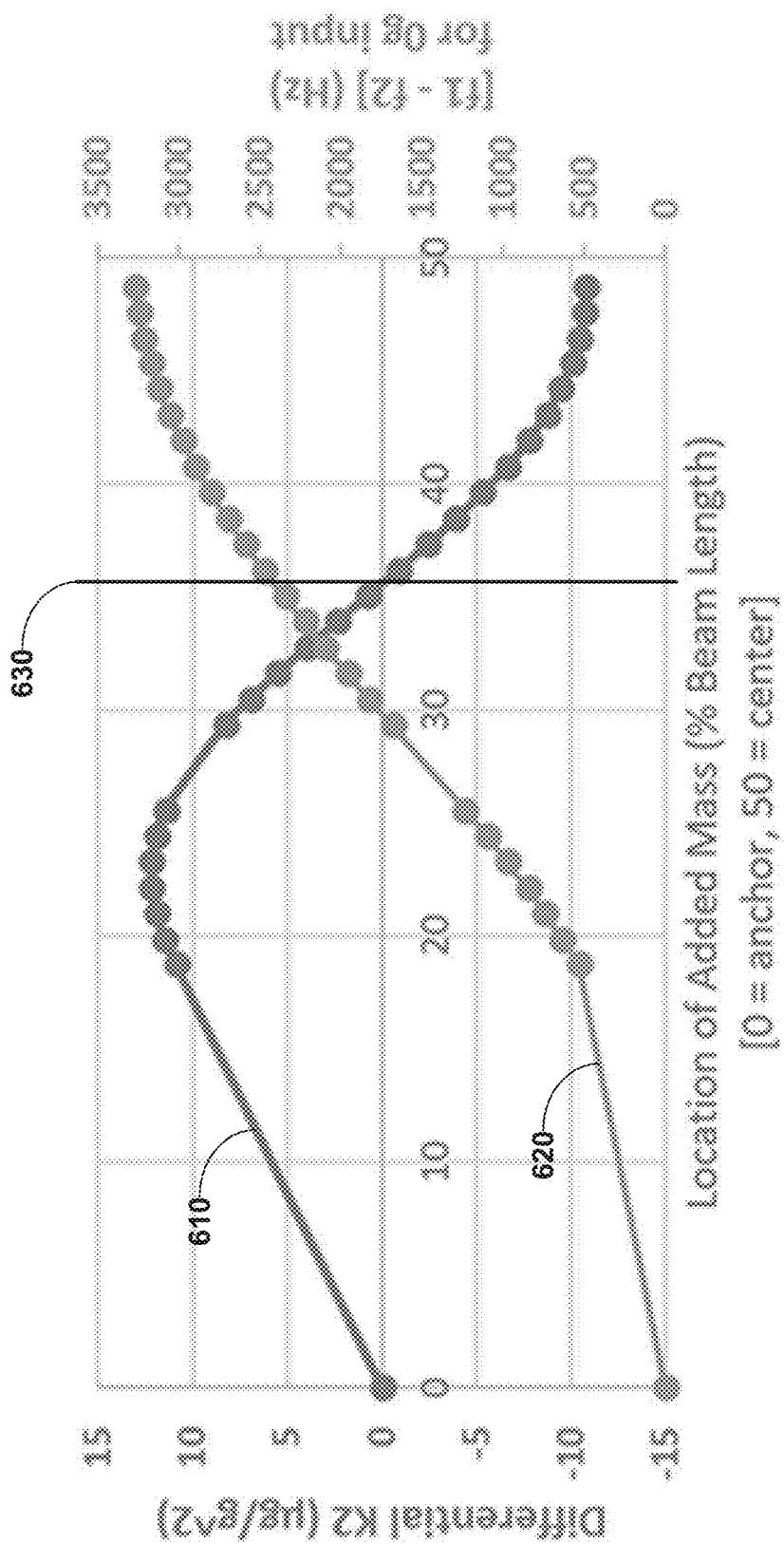
FIG. 6 is a graph illustrating a first plot representing a quadratic nonlinearity coefficient as a function of added mass position and a second plot representing a zero acceleration resonant frequency difference as a function of added mass position, in accordance with one or more techniques of this disclosure.

FIG. 6 is a graph illustrating a first plot 610 representing a quadratic nonlinearity coefficient as a function of added mass position and a second plot 620 representing a zero acceleration resonant frequency difference as a function of added mass position, in accordance with one or more techniques of this disclosure. For example, the "Location of Added Mass" may represent a position of added masses such as added mass 462A and added mass 462B on first mechanical beam 424A, where the position is a percentage of a length of first mechanical beam 424A extending from first end 456 to second end 457. As seen in first plot 610 of FIG. 6, the quadratic nonlinearity coefficient ($K_2$) is zero when the position of added mass 462A and added mass 462B is 35% of the length of first mechanical beam 424A. Additionally, as seen at point 630 of second plot 620, a difference between the resonant frequency of first resonator 420 and a difference between the resonant frequency of second resonator 530 may is nonzero when the position of added mass 462A and added mass 462B is 35% of the length of first mechanical beam 424A. As such, it may be beneficial for the position of added mass 462A and added mass 462B to be 35% of the length of first mechanical beam 424A, since the quadratic nonlinearity coefficient is zero and the frequency difference is nonzero.

In some examples, point 630 may represent an ideal location of added mass 462A and added mass 462B along first mechanical beam 424A. In some examples, a resonant frequency of first resonator 420 at zero acceleration may be within a range from 25 kilohertz (KHz) to 30 KHz. In some examples, a resonant frequency of second resonator 530 at zero acceleration may be within a range from 25 kilohertz (KHz) to 30 KHz. In some examples, a difference between the resonant frequency of first resonator 420 at zero acceleration and a resonant frequency of second resonator 530 at zero acceleration may be within a range from 250 Hertz (Hz) to 3500 Hz when added mass 462A and added mass 462B is placed at 35% of a length of first mechanical beam 424A.

Figure 7:
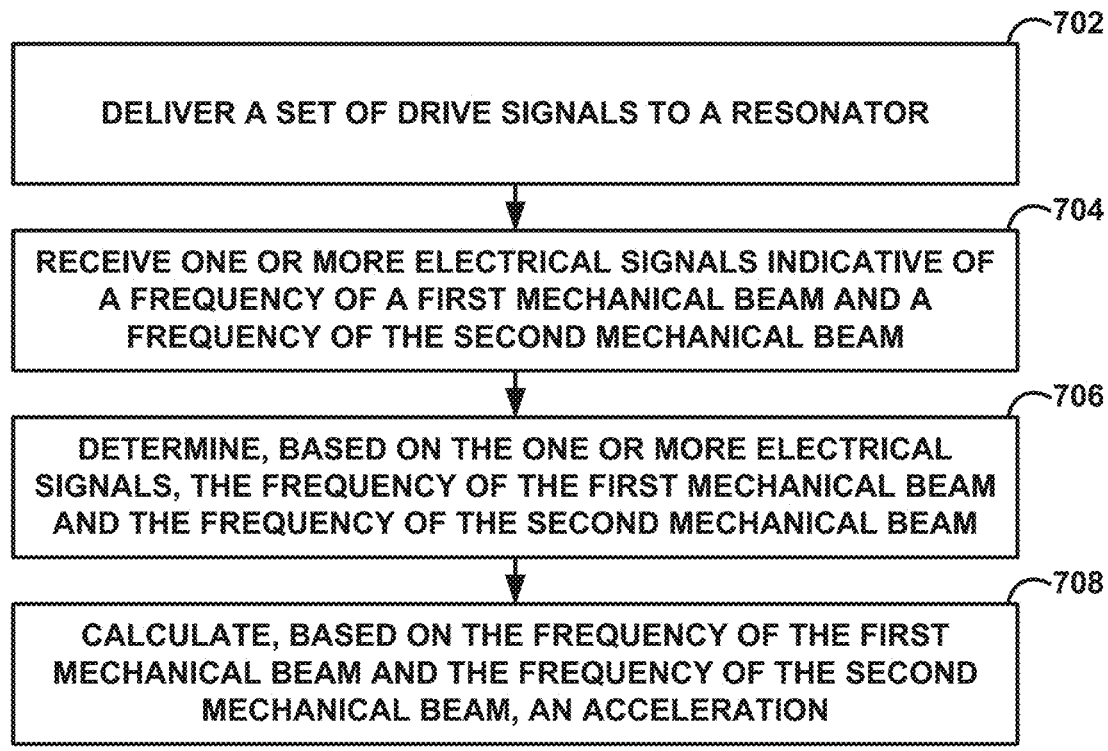
FIG. 7 is a flow diagram illustrating an example operation for determining an acceleration of a VBA, in accordance with one or more techniques of this disclosure.

FIG. 7 is a flow diagram illustrating an example operation for determining an acceleration of a VBA, in accordance with one or more techniques of this disclosure. FIG. 7 is described with respect to processing circuitry 102, resonator driver circuits 104, and proof mass assembly 110 of FIG. 1. However, the techniques of FIG. 7 may be performed by different components of processing circuitry 102, resonator driver circuits 104, and proof mass assembly 110 or by additional or alternative accelerometer systems.

Resonator driver circuit 104A may deliver a set of drive signals to first resonator 120 (702). Resonator driver circuit 104A may be electrically coupled to first resonator 120. Resonator driver circuit 104A may output the set of drive signals to first resonator 120, causing first resonator 120 to vibrate at a resonant frequency. Processing circuitry 102 may receive, via resonator driver circuit 104A, one or more electrical signals indicative of a frequency of first mechanical beam 124A and second mechanical beam 124B (704). Subsequently, processing circuitry 102 may determine, based on the one or more electrical signals, the frequency of first mechanical beam 124A and second mechanical beam 124B (706). The mechanical vibration frequency of first mechanical beam 124A and the mechanical vibration frequency of second mechanical beam 124B may represent a resonant frequency of first resonator 120. The resonant frequency of first resonator 120 may be correlated with an acceleration of a VBA, such as VBA 110 of FIG. 2. As such, processing circuitry 102 may calculate, based on the frequency of first mechanical beam 124A and the frequency of second mechanical beam 124B, the acceleration of VBA 110 (708).

Although the example operation is described with respect to first resonator 120, processing circuitry 102 may additionally or alternatively determine a resonant frequency of second resonator 130. In some examples, processing circuitry 102 may be configured to determine a difference between the resonant frequency of first resonator 120 and the resonant frequency of second resonator 130 and calculate the acceleration based on a difference in the resonant frequencies.

In one or more examples, the accelerometers described herein may utilize hardware, software, firmware, or any combination thereof for achieving the functions described. Those functions implemented in software may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is nontransitory or (2) a communication medium such as a signal or carrier wave. Data storage media may be any available media that can be accessed by one or more computers or one or more processors to retrieve instructions, code and/or data structures for implementation of the techniques described in this disclosure.

Instructions may be executed by one or more processors within the accelerometer or communicatively coupled to the accelerometer. The one or more processors may, for example, include one or more DSPs, general purpose microprocessors, application specific integrated circuits ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for performing the techniques described herein. Also, the techniques could be fully implemented in one or more circuits or logic elements.

The techniques of this disclosure may be implemented in a wide variety of devices or apparatuses that include integrated circuits (ICs) or sets of ICs (e.g., chip sets). Various components, modules, or units are described in this disclosure to emphasize functional aspects of devices configured to perform the disclosed techniques, but do not necessarily require realization by different hardware units. Rather, various units may be combined or provided by a collection of interoperative hardware units, including one or more processors as described above, in conjunction with suitable software and/or firmware.

What is claimed is:

1. A system comprising:
    a proof mass assembly comprising:
        a proof mass;
        a resonator connection structure, wherein the resonator connection structure extends parallel to a long axis;
        a hinge flexure configured to connect the proof mass to the resonator connection structure, wherein the proof mass rotates about the hinge flexure in response to an acceleration of the proof mass assembly parallel to the long axis of the resonator connection structure; and
        a first resonator configured to connect the proof mass to the resonator connection structure, wherein the first resonator comprises:
            a first mechanical beam comprising a first primary member extending parallel to the long axis, wherein the first mechanical beam comprises a first mass located at a point along the long axis, and wherein the first mass is connected to a first secondary member that is perpendicular to the first primary member of the first mechanical beam; and
            a second mechanical beam comprising a second primary member extending parallel to the long axis, wherein the second mechanical beam comprises a second mass located at the point along the long axis, and wherein the second mass is connected to a second secondary member that is perpendicular to the second primary member of the second mechanical beam; and
    processing circuitry configured to:
        receive, from the first resonator, one or more electrical signals indicative of a frequency of the first mechanical beam and a frequency of the second mechanical beam;
        determine, based on the one or more electrical signals, the frequency of the first mechanical beam and the frequency of the second mechanical beam; and
        calculate, based on the frequency of the first mechanical beam and the frequency of the second mechanical beam, an acceleration of the proof mass assembly.

2. The system of claim 1,
    wherein the first mechanical beam comprises a set of first secondary members, wherein each first secondary member of the set of first secondary members extends perpendicular to the long axis, wherein the set of first secondary members comprises the first secondary member connected to the first mass, and
    wherein the second mechanical beam comprises a set of second secondary members, wherein each second secondary member of the set of second secondary members extends perpendicular to the long axis, and wherein the set of second secondary members comprises the second secondary member connected to the second mass.

3. The system of claim 1, wherein the one or more electrical signals comprise a first one or more electrical signals, wherein the point along the long axis of the resonator connection structure comprises a first point along the long axis, and wherein the proof mass assembly further comprises:
    a second resonator configured to connect the proof mass to the resonator connection structure, wherein the second resonator comprises:
        a third mechanical beam extending parallel to the long axis of the resonator connection structure, wherein the third mechanical beam forms a first gap located at a second point along the long axis; and
        a fourth mechanical beam extending parallel to the long axis, wherein the fourth mechanical beam forms a second gap located at the second point along the long axis, and wherein the processing circuitry is further configured to:
        receive, from the second resonator, a second one or more electrical signals indicative of a frequency of the third mechanical beam and a frequency of the fourth mechanical beam;
        determine, based on the second one or more electrical signals, the frequency of the third mechanical beam and the frequency of the fourth mechanical beam; and
        calculate, based on the frequency of the third mechanical beam and the frequency of the fourth mechanical beam, the acceleration of the proof mass assembly.

4. The system of claim 3, wherein the third mechanical beam comprises:
    a third primary member extending parallel to the long axis of the resonator connection structure; and
    a set of third secondary members, wherein each third secondary member of the set of third secondary members extends perpendicular to the long axis, wherein at least one third secondary member of the set of third secondary members forms the first gap, and wherein the fourth mechanical beam comprises:
    a fourth primary member extending parallel to the long axis; and
    a set of fourth secondary members, wherein each fourth secondary member of the set of fourth secondary members extends perpendicular to the long axis, and wherein at least one fourth secondary member of the set of fourth secondary members forms the second gap.

5. The system of claim 3, wherein the proof mass assembly further comprises:
a first set of electrodes placed outside of the first resonator proximate to the first mechanical beam, wherein the first set of electrodes are configured to generate a first electrical signal of the first one or more electrical signals;
a second set of electrodes placed between the first mechanical beam and the second mechanical beam, wherein the second set of electrodes are configured to generate a second electrical signal of the first one or more electrical signals; and
a third set of electrodes placed outside of the first resonator proximate to the second mechanical beam, wherein the third set of electrodes are configured to generate a third electrical signal of the first one or more electrical signals, and
wherein to determine the frequency of the first mechanical beam and the frequency of the second mechanical beam, the processing circuitry configured to:
calculate a difference between the first electrical signal and the second electrical signal;
calculate a difference between the second electrical signal and the third electrical signal;
calculate the frequency of the first mechanical beam based on the difference between the first electrical signal and the second electrical signal; and
calculate the frequency of the second mechanical beam based on the difference between the second electrical signal and the third electrical signal.

6. The system of claim 5, wherein the proof mass assembly further comprises:
a fourth set of electrodes placed outside of the second resonator proximate to the third mechanical beam, wherein the fourth set of electrodes are configured to generate a fourth electrical signal of the second one or more electrical signals;
a fifth set of electrodes placed between the third mechanical beam and the fourth mechanical beam, wherein the fifth set of electrodes are configured to generate a fifth electrical signal of the second one or more electrical signals; and
a sixth set of electrodes placed outside of the second resonator proximate to the fourth mechanical beam, wherein the sixth set of electrodes are configured to generate a sixth electrical signal of the second one or more electrical signals, and wherein to determine the frequency of the third mechanical beam and the frequency of the fourth mechanical beam, the processing circuitry is configured to:
calculate a difference between the fourth electrical signal and the fifth electrical signal;
calculate a difference between the fifth electrical signal and the sixth electrical signal;
calculate the frequency of the third mechanical beam based on the difference between the fourth electrical signal and the fifth electrical signal; and
calculate the frequency of the fourth mechanical beam based on the difference between the fifth electrical signal and the sixth electrical signal.

7. The system of claim 6, wherein the processing circuitry is further configured to:
determine, based on the frequency of the first mechanical beam and the frequency of the second mechanical beam, a frequency of the first resonator;
determine, based on the frequency of the third mechanical beam and the frequency of the fourth mechanical beam, a frequency of the second resonator;
calculate a difference between the frequency of the first resonator and the frequency of the second resonator; and
calculate, based on the difference between the frequency of the first resonator and the frequency of the second resonator, the acceleration of the proof mass assembly.

8. The system of claim 7, wherein a magnitude of the difference between the frequency of the first resonator and the frequency of the second resonator is greater than zero when the acceleration of the proof mass assembly is zero meters per second squared ($m/s^2$).

9. The system of claim 1, wherein the first mechanical beam comprises a first proximal end and a first distal end, and wherein the point of first mass along the long axis of the resonator connection structure is located within a range from 0.25 to 0.45 of the length of first mechanical beam from the first proximal end to the first distal end.

10. The system of claim 9, wherein the second mechanical beam comprises a second proximal end and a second distal end, and wherein the point of the second mass along the long axis of the resonator connection structure is located within a range from 0.25 to 0.45 of the length of second mechanical beam from the proximal end to the distal end.

11. A method comprising:
receiving, by processing circuitry, one or more electrical signals indicative of a frequency of a first mechanical beam and a frequency of a second mechanical beam from a first resonator, wherein a proof mass assembly comprises:
a proof mass;
a resonator connection structure, wherein the resonator connection structure extends parallel to a long axis;
a hinge flexure configured to connect the proof mass to the resonator connection structure, wherein the proof mass rotates about the hinge flexure in response to an acceleration of the proof mass assembly parallel to the long axis of the resonator connection structure; and
the first resonator configured to connect the proof mass to the resonator connection structure, wherein the first resonator comprises:
the first mechanical beam comprising a first primary member extending parallel to the long axis, wherein the first mechanical beam comprises a first mass located at a point along the long axis, and wherein the first mass is connected to a first secondary member that is perpendicular to the first primary member of the first mechanical beam; and
the second mechanical beam comprising a second primary member extending parallel to the long axis, wherein the second mechanical beam comprises a second mass located at the point along the long axis, and wherein the second mass is connected to a second secondary member that is perpendicular to the second primary member of the second mechanical beam;
determining, by the processing circuitry and based on the one or more electrical signals, the frequency of the first mechanical beam and the frequency of the second mechanical beam; and
calculating, by the processing circuitry and based on the frequency of the first mechanical beam and the frequency of the second mechanical beam, an acceleration of the proof mass assembly.

12. The method of claim 11, wherein the one or more electrical signals comprise a first one or more electrical signals, wherein the point along the long axis of the resonator connection structure comprises a first point along the long axis, and wherein the method further comprises:
receiving, by the processing circuitry from a second resonator, a second one or more electrical signals indicative of a frequency of a third mechanical beam and a frequency of a fourth mechanical beam, wherein the proof mass assembly further comprises:
the second resonator configured to connect the proof mass to the resonator connection structure, wherein the second resonator comprises:
the third mechanical beam extending parallel to the long axis of the resonator connection structure, wherein the third mechanical beam forms a first gap located at a second point along the long axis; and
the fourth mechanical beam extending parallel to the long axis, wherein the fourth mechanical beam forms a second gap located at the second point along the long axis;
determining, by the processing circuitry and based on the second one or more electrical signals, the frequency of the third mechanical beam and the frequency of the fourth mechanical beam; and
calculate, by the processing circuitry and based on the frequency of the third mechanical beam and the frequency of the fourth mechanical beam, the acceleration of the proof mass assembly.

13. The method of claim 12, wherein the proof mass assembly further comprises:
a first set of electrodes placed outside of the first resonator proximate to the first mechanical beam, wherein the first set of electrodes are configured to generate a first electrical signal of the first one or more electrical signals;
a second set of electrodes placed between the first mechanical beam and the second mechanical beam, wherein the second set of electrodes are configured to generate a second electrical signal of the first one or more electrical signals; and
a third set of electrodes placed outside of the first resonator proximate to the second mechanical beam, wherein the third set of electrodes are configured to generate a third electrical signal of the first one or more electrical signals, and wherein determining the frequency of the first mechanical beam and the frequency of the second mechanical beam comprises:
calculating, by the processing circuitry, a difference between the first electrical signal and the second electrical signal;
calculating, by the processing circuitry, a difference between the second electrical signal and the third electrical signal;
calculating, by the processing circuitry, the frequency of the first mechanical beam based on the difference between the first electrical signal and the second electrical signal; and
calculating, by the processing circuitry, the frequency of the second mechanical beam based on the difference between the second electrical signal and the third electrical signal.

14. The method of claim 13, wherein the proof mass assembly further comprises:
a fourth set of electrodes placed outside of the second resonator proximate to the third mechanical beam, wherein the fourth set of electrodes are configured to generate a fourth electrical signal of the second one or more electrical signals;
a fifth set of electrodes placed between the third mechanical beam and the fourth mechanical beam, wherein the fifth set of electrodes are configured to generate a fifth electrical signal of the second one or more electrical signals; and
a sixth set of electrodes placed outside of the second resonator proximate to the fourth mechanical beam, wherein the sixth set of electrodes are configured to generate a sixth electrical signal of the second one or more electrical signals, and wherein determining the frequency of the third mechanical beam and the frequency of the fourth mechanical beam comprises:
calculating, by the processing circuitry, a difference between the fourth electrical signal and the fifth electrical signal;
calculating, by the processing circuitry, a difference between the fifth electrical signal and the sixth electrical signal;
calculating, by the processing circuitry, the frequency of the third mechanical beam based on the difference between the fourth electrical signal and the fifth electrical signal; and
calculating, by the processing circuitry, the frequency of the fourth mechanical beam based on the difference between the fifth electrical signal and the sixth electrical signal.

15. The method of claim 14, wherein the method further comprises:
determining, based on the frequency of the first mechanical beam and the frequency of the second mechanical beam, a frequency of the first resonator;
determining, based on the frequency of the third mechanical beam and the frequency of the fourth mechanical beam, a frequency of the second resonator;
calculating a difference between the frequency of the first resonator and the frequency of the second resonator; and
calculating, based on the difference between the frequency of the first resonator and the frequency of the second resonator, the acceleration of the proof mass assembly.

16. A device comprising:
a proof mass;
a resonator connection structure, wherein the resonator connection structure extends parallel to a long axis;
a hinge flexure configured to connect the proof mass to the resonator connection structure, wherein the proof mass rotates about the hinge flexure in response to an acceleration of the device parallel to the long axis of the resonator connection structure; and
a first resonator configured to connect the proof mass to the resonator connection structure, wherein the first resonator comprises:
a first mechanical beam comprising a first primary member extending parallel to the long axis, wherein the first mechanical beam comprises a first mass located at a point along the long axis, and wherein the first mass is connected to a first secondary member that is perpendicular to the first primary member of the first mechanical beam; and
a second mechanical beam comprising a second primary member extending parallel to the long axis, wherein the second mechanical beam comprises a second mass located at the point along the long axis, wherein the second mass is connected to a second secondary member that is perpendicular to the second primary member of the second mechanical beam, and wherein the first resonator is configured to:
output one or more electrical signals indicative of a frequency of the first mechanical beam and a frequency of the second mechanical beam.

17. The device of claim 16,
wherein the first mechanical beam comprises a set of first secondary members, wherein each first secondary member of the set of first secondary members extends perpendicular to the long axis, wherein the set of first secondary members comprises the first secondary member connected to the first mass, and
wherein the second mechanical beam comprises a set of second secondary members, wherein each second secondary member of the set of second secondary members extends perpendicular to the long axis, and wherein the set of second secondary members comprises the second secondary member connected to the second mass.

18. The device of claim 16, wherein the one or more electrical signals comprise a first one or more electrical signals, wherein the point along the long axis of the resonator connection structure comprises a first point along the long axis, and wherein the device further comprises:
a second resonator configured to connect the proof mass to the resonator connection structure, wherein the second resonator comprises:
a third mechanical beam extending parallel to the long axis of the resonator connection structure, wherein the third mechanical beam forms a first gap located at a second point along the long axis; and
a fourth mechanical beam extending parallel to the long axis, wherein the fourth mechanical beam forms a second gap located at the second point along the long axis, and wherein the second resonator is configured to:
output a second one or more electrical signals indicative of a frequency of the third mechanical beam and a frequency of the fourth mechanical beam.

19. The device of claim 18, wherein the third mechanical beam comprises:
a third primary member extending parallel to the long axis of the resonator connection structure; and
a set of third secondary members, wherein each third secondary member of the set of third secondary members extends perpendicular to the long axis, wherein at least one third secondary member of the set of third secondary members forms the first gap, and wherein the fourth mechanical beam comprises:
a fourth primary member extending parallel to the long axis; and
a set of fourth secondary members, wherein each fourth secondary member of the set of fourth secondary members extends perpendicular to the long axis, and wherein at least one fourth secondary member of the set of fourth secondary members forms the second gap.

20. The device of claim 16, wherein the first mechanical beam comprises a first proximal end and a first distal end, and wherein the point of first mass along the long axis of the resonator connection structure is located within a range from 0.25 to 0.45 of the length of first mechanical beam from the first proximal end to the first distal end.

* * * * *